(12) United States Patent
Akiyama et al.

(10) Patent No.: US 7,292,514 B2
(45) Date of Patent: Nov. 6, 2007

(54) APPARATUS FOR RECORDING INFORMATION IN INFORMATION RECORDING MEDIUM, INFORMATION RECORDING MEDIUM, METHOD FOR RECORDING INFORMATION IN INFORMATION RECORDING MEDIUM, PROGRAM FOR RECORDING INFORMATION IN INFORMATION RECORDING MEDIUM, AND PROGRAM PRODUCT

(75) Inventors: Tetsuya Akiyama, Hirakata (JP); Naoyasu Miyagawa, Kawanishi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 550 days.

(21) Appl. No.: 10/850,366

(22) Filed: May 21, 2004

(65) Prior Publication Data

US 2004/0246861 A1   Dec. 9, 2004

(30) Foreign Application Priority Data

May 23, 2003  (JP) .............................. 2003-146774

(51) Int. Cl.
 *G11B 7/00*  (2006.01)
(52) U.S. Cl. ................. 369/59.11; 369/275.3
(58) Field of Classification Search ............. 369/59.11, 369/59.12, 275.3, 275.2, 275.4, 59.25
See application file for complete search history.

(56) References Cited

U.S. PATENT DOCUMENTS 4,865,955 A   9/1989  Pan et al.
5,490,126 A   2/1996  Furumiya et al.
5,555,537 A   9/1996  Imaino et al.
5,636,194 A   6/1997  Furumiya et al.
5,740,149 A   4/1998  Iwasaki et al.
5,761,179 A   6/1998  Iwasaki et al.
7,130,256 B2 * 10/2006 Toda et al. .............. 369/59.11

FOREIGN PATENT DOCUMENTS

EP    1 040 937   10/2000
EP    1 195 756    4/2002
EP    1 215 669    6/2002

* cited by examiner

*Primary Examiner*—Nabil Hindi
(74) *Attorney, Agent, or Firm*—Wenderoth, Lind & Ponack, L.L.P.

(57) ABSTRACT

A multi pulse section 30 is generated in the mark forming portion corresponding to a mark 21 having a length nTw (n≧=2), where Tw represents a reference clock cycle. The multi pulse section 30 consists of pulses of the number (n−1) each having the power level a, and pulses of the number (n−2) each having the power level b (b<a), each of which is formed between the adjoining pulses having the power level a. Further, a heat blocking pulse 35 having the power level c (c<a) is generated immediately after the multi pulse section 30. A bias section 36 having the power level d (c<d<a) is generated between the heat blocking pulse 35 and a succeeding multi pulse section 30. The bias section 36 corresponds to a space 22. The time length tc of the heat blocking pulse 35 is: tc≧Tw. With this arrangement, information can be precisely recorded in and reproduced from a WORM type information recording medium.

30 Claims, 13 Drawing Sheets

APPARATUS FOR RECORDING INFORMATION IN INFORMATION RECORDING MEDIUM, INFORMATION RECORDING MEDIUM, METHOD FOR RECORDING INFORMATION IN INFORMATION RECORDING MEDIUM, PROGRAM FOR RECORDING INFORMATION IN INFORMATION RECORDING MEDIUM, AND PROGRAM PRODUCT

BACKGROUND OF THE INVENTION

1. Field of the Invention

The present invention relates to information recording medium of recording and reproducing information by irradiation of a beam such as laser light, and a technology of recording information in the recording medium.

2. Description of the Related Art

There are known optical information recording media serving as memories of large-capacity and high-density. As one of such recording media, there is known a medium provided with a film made of a material capable of changing the phase between amorphous state and crystalline state. The film is attached to a substrate, as a recording layer. Information is recordable in the recording medium by thermal energy due to irradiation of laser light. There are known two types of the media: one is a write-once-read-many type (hereinafter, simply called as "WORM type") in which information is recordable only once, and the other is an erasable type in which information is rewritable.

As the phase-changeable material used in formation of the recording layer of the WORM type medium, there is known an alloy film containing a Te oxide or a like compound as a main component, e.g., TeOPd-alloy. In the WORM type recording medium, information is recorded by formation of recording marks which are obtained by partially transforming the recording layer to a crystalline state. The crystallization is conducted by heating the recording layer to a crystallization temperature or higher.

As a phase-changeable material used in formation of the recording layer of the erasable type medium, there is known an alloy film containing Ge, Sb, Te, In, etc., as main components, e.g., GeSbTe-alloy. In the erasable type recording medium, information is recorded by formation of recording marks which are obtained by partially transforming the recording layer to an amorphous state, and the recorded information is erased by transforming the recording marks to a crystalline state. The recording layer is transformed into the amorphous state by heating the recording layer to the melting point thereof or higher, followed by rapid cooling. On the other hand, the recording layer is transformed into the crystalline state by heating the recording layer to such a temperature range between the crystallizing temperature and the melting point of the recording layer.

There is known a mark-length recording method, as a method of recording information in a medium. In the mark-length recording, marks of different lengths are formed between spaces of different lengths, so that each mark length and each space length (more specifically, the positions of the frontal edge and the tail edge of each mark) carry information.

In the mark-length recording, if a laser pulse of a strong intensity is irradiated in an attempt to form a long mark, temperature rise in a rear part of the mark is promoted due to heat generated around a frontal part of the mark, and as a result, a deformed mark having a small width at the frontal part and a large width at the rear part is formed, thereby degrading the signal quality of the mark. In view of this, it is advantageous to employ a method, as shown in FIG. 17. Specifically, in FIG. 17, modulated laser light is irradiated in a waveform of a pulse train comprising a multi-pulse section 90, and an off pulse 94 following the multi-pulse section 90 to form a mark 21, wherein the multi-pulse section 90 consists of a first pulse 91 corresponding to a frontal end 23 of the mark 21 which is formed along an information track 20, intermediate pulses 92 corresponding to an intermediate portion of the mark 21, and a final pulse 93 corresponding to a tail end 24 of the mark 21, and the off pulse 94 following the final pulse 93 has a power lower than that of the multi-pulse section 90. In FIG. 17, $\alpha$, $\beta$ respectively represent timings of generating the first pulse 91 and the final pulse 93, t1, t2, t3, and t4 respectively represent time lengths of the first pulse 91, the intermediate pulse 92, the final pulse 93, and the off pulse 94. The symbols "a", "b", and "d" respectively represent an intensity of laser light on the high-power side of the multi-pulse section 90, an intensity of laser light on the low-power side of the multi-pulse section 90 and the off pulse 94, and an intensity of laser light in a space 22.

According to the conventional recording method applied to the erasable type optical information recording medium, it is preferable to set the pulse widths t1, t2, t3, and t4 to possible lowest values depending on the linear velocity in recording within respective ranges of $0.5Tw \leq t1 \leq 2Tw$, $0.4Tw \leq t2 = t3 \leq 0.6Tw$, $0.5Tw \leq t4 \leq 1Tw$ where Tw represents a reference clock cycle (also called as "window width") of a signal to be recorded, and to select the pulse intensities "a", "b", and "d" in such a manner that the amplitude of the reproduced signal is not lower than a predetermined value (see Japanese Patent No. 3124720, called as "D1").

There is known a drawback that as high-density recording is progressed, a small gap between adjoining marks 21 may adversely affect formation of the adjoining mark(s) 21 due to heat generated during formation of the target mark 21, and the edge positions of the marks 21 may be displaced to thereby degrade the signal quality. The displacement of the edge position due to heat interference between the adjoining marks 21 differs depending on the length of the mark 21 to be recorded, and the lengths of the spaces preceding and succeeding to the target mark 21. Therefore, in order to solve this problem, there is proposed a signal pattern adaptive recording compensation method of recording marks by flexibly changing the generation timing $\alpha$ of the first pulse 91 and the generation timing $\beta$ of the final pulse 93 depending on the length of the mark 21 to be recorded, and the lengths of the spaces 22 preceding and succeeding to the target mark 21 (e.g., see Japanese Patent No. 2679596, called as "D2").

Erasable type recording media have been developed because of convenience that the media are usable a number of times in light of the property that information is rewritable. However, a demand for development of WORM type recording media capable of recording information only once is also great in light of the property that information falsification is impossible.

In the WORM type information recording media, information is recorded by formation of recording marks which are obtained by partially transforming the recording layer to a crystalline state. The crystallization is carried out by heating the recording layer to or higher than the crystallization temperature, which is much lower than the melting point thereof. Accordingly, the information recording media of WORM type are likely to be susceptible to heat transfer from the preceding mark 21 which has been formed immediately before the mark 21 being formed, as compared with the recording media of erasable type in which the mark 21 is formed by rapidly cooling the recording layer after heating the same to or higher than the melting point thereof.

In view of the above aspect, there rises a drawback that jitter of reproduction signals is great in high-density recording conditions, if the conventional recording method as described above referring to FIG. 17 is applied to the recording media of WORM type using the recording layer made of e.g., TeOPD alloy. Thereby, the signal quality may be degraded, and precise information recording and reproduction may no be accomplished.

SUMMARY OF THE INVENTION

In view of the above, it is an object of the present invention to provide a recording technology capable of precisely recording information in a WORM type information recording medium, and an information recording medium for being recorded with information by using the recording technology.

According to an aspect of the present invention, an apparatus for recording information in a write-once-read-many type information recording medium by partially transforming a recording layer into a crystalline state by irradiation of a beam to form marks, modulates the beam to form a pulse train, the pulse train comprising: a multi pulse section including, in a portion where the mark is formed, a single pulse or a plurality of pulses each having a first power level a, and a pulse having a second power level b (b<a) between the adjoining pulses of the first power level a if the multi pulse section includes the plurality of pulses of the first power level a; a heat blocking pulse having a third power level c (c<a) immediately after the multi pulse section; and a bias section having a fourth power level d between the heat blocking pulse and a succeeding multi pulse section, and the pulse train being so formed that a time length tc of the heat blocking pulse and a reference clock cycle Tw of a signal to be recorded satisfy a relation: tc≧Tw, and the third power level c and the fourth power level d satisfy a relation: c<d.

According to the recording technology of the present invention, user data can be precisely recorded in the WORM type information recording medium in which information is recorded by formation of marks obtained by partially transforming the recording layer to a crystalline state by irradiation of a beam such as laser light. Further, this arrangement enables to obtain the information recording medium in which the user data is precisely recorded.

These and other objects, features and advantages of the present invention will become more apparent upon reading of the following detailed description along with the accompanying drawings.

DETAILED DESCRIPTION OF THE PREFERRED EMBODIMENTS

First Embodiment

Figure 1:
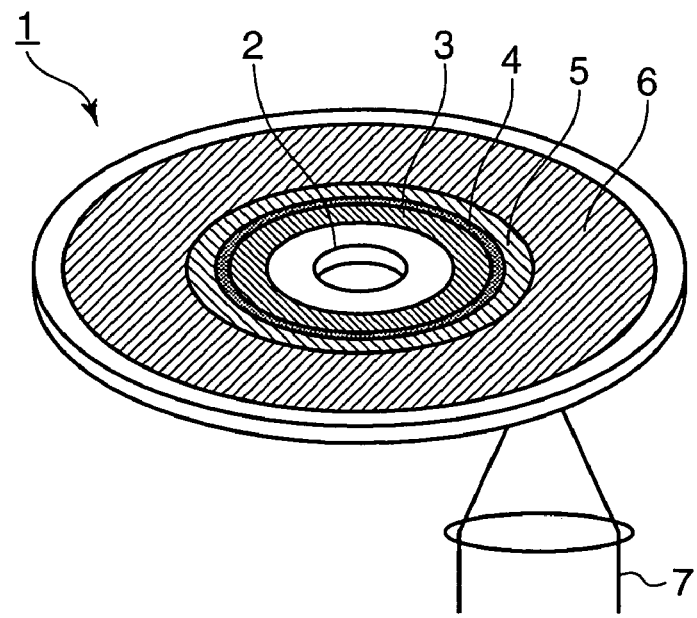
FIG. 1 is a perspective view of an information recording medium to which a recording technology in accordance with a first embodiment of the present invention is applied.
Figure 2:
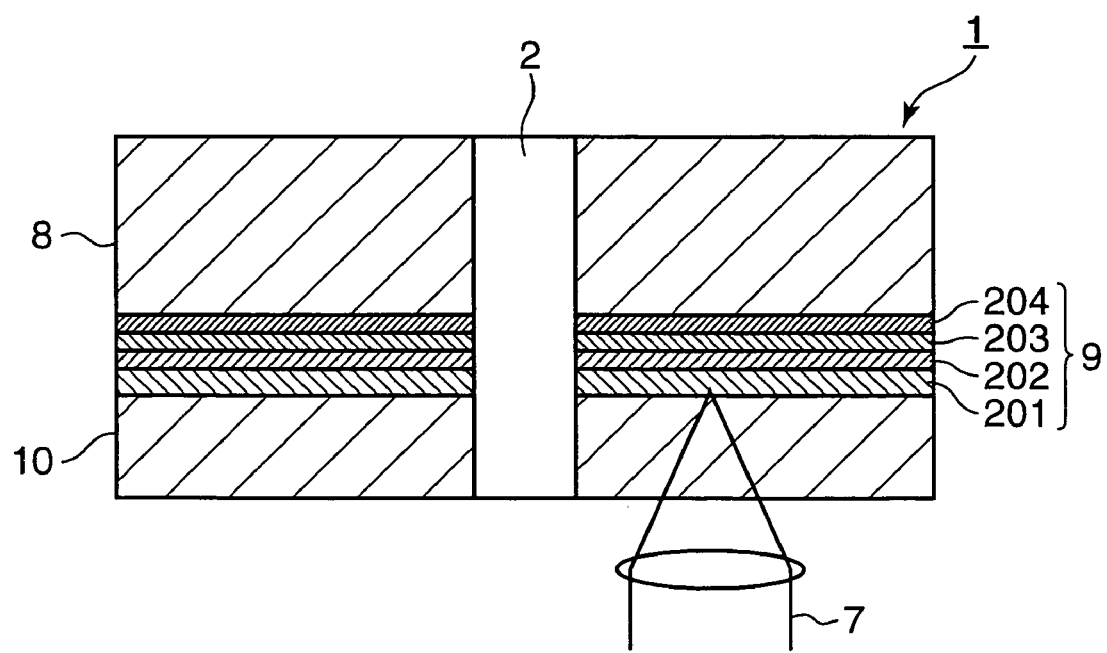
FIG. 2 is a cross-sectional view of the information recording medium shown in FIG. 1.

FIG. 1 is a perspective view exemplarily showing an optical information recording medium to which a recording technology according to an embodiment of the present invention is applied. FIG. 2 is a cross-sectional view enlargedly showing the recording medium in FIG. 1 in thickness direction thereof. As shown in FIG. 2, the information recording medium 1 is produced in such a manner that a laminated recording layer 9 is formed on a substrate 8 having a thickness of about 1.1 mm and made of polycarbonate, followed by deposition of a protective film 10 of 0.1 mm in thickness. The recording layer 9 consists of a protective layer 201 made of a dielectric material, a phase-changeable layer 202 made of a TeOPd-alloy film, a protective layer 203 made of a dielectric material, and a reflective layer 204 made of a metallic material. The medium 1 is formed with a center hole 2 through which the medium 1 is supportively mounted on a recording/reproducing apparatus. Information track (not shown) of about 20 nm in thickness, and about 0.2 μm in width for tracking laser light 7 in recording and reproducing is formed at a pitch of 0.32 μm in the substrate 8.

As shown in FIG. 1, the information recording medium 1 is provided with a read-in region 3, a test recording region 4, a recording/reproducing condition recording region 5, and an information recording region 6. The read-in region 3 is used exclusively for reproduction, and is formed between about 22 mm and 23 mm in radius. Identification (ID) information or like information of identifying the information recording medium 1 which has been recorded in the read-in region 3 is acquired by wobbling the information track on the read-in region 3. The test recording region 4 is formed between about 23 mm and 23.5 mm in radius for determining the signal quality by recording specific data as trial data and to implement learning operation for determining an optimal recording condition. The recording/reproducing condition recording region 5 is formed between about 23.5 mm and 24 mm in radius. The optimal recording condition determined by the learning operation is allowed to be recorded in the region 5 by the recording/reproducing apparatus. The information recording region 6 is formed between about 24 mm and 58 mm in radius for recording user data.

In recording information, recording marks are formed by partially transforming the phase-changing layer 202 from an amorphous state to a crystalline state by irradiating the laser light 7 onto the phase-changing layer 202. The recording marks are formed by the mark length recording method in which each of the mark lengths and space (namely, the space between the adjoining marks) lengths, more specifically, the positions corresponding to the frontal edge and the rear edge of the mark, carry information.

Figure 3:
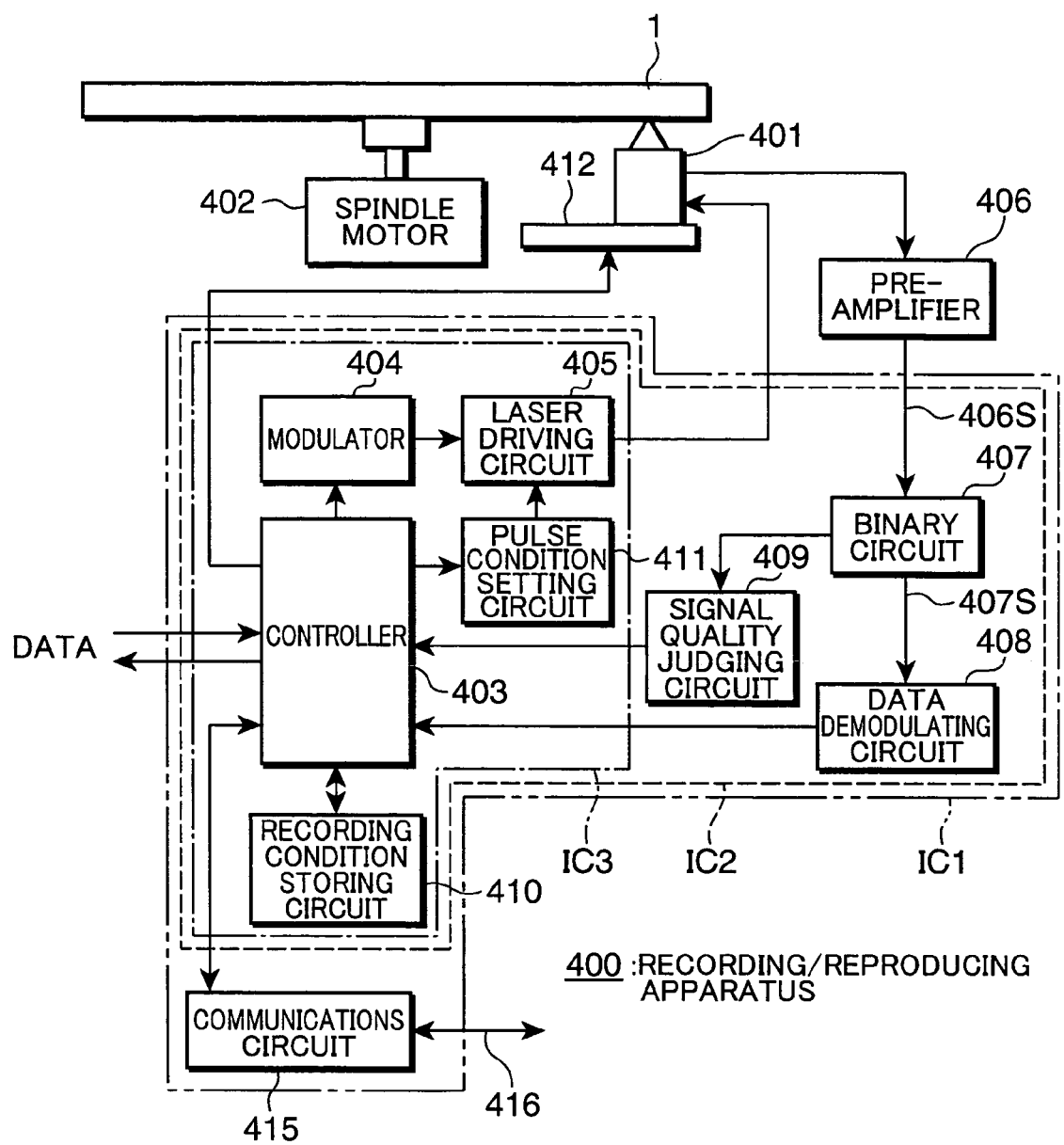
FIG. 3 is a block diagram of a recording apparatus in accordance with a first embodiment of the present invention.

FIG. 3 is a block diagram showing a configuration of one embodiment of a recording apparatus according to the present invention, in which the optical information recording medium 1 shown in FIGS. 1 and 2 is mounted on the recording apparatus. The recording apparatus is configured as a recording/reproducing apparatus 400 capable of reproducing information, as well as recording information. The apparatus 400 includes a spindle motor 402 for supportively rotating the information recording medium 1, a controller 403, a modulator 404 for converting data to be recorded into recording signals, a laser driving circuit 405 for driving a semiconductor laser in accordance with the recording signals, an optical head 401 which is equipped with the semiconductor laser for irradiating a laser beam of the wavelength 405 nm, and an objective lens having the numerical aperture (NA) of 0.85, and which is adapted to record information by condensing the laser beam on the medium 1 and to acquire reproduction signals from the light reflected on the medium 1, a pre-amplifier 406 for amplifying the reproduction signal to generate an information reproduction signal 406S, a binary circuit 407 for converting the information reproduction signal 406S to a digitized signal 407S, a data demodulating circuit 408 for demodulating the digitized signal 407S to data, a signal quality judging circuit 409 for judging the quality of the signal indicative of specific data that has been recorded and reproduced as trial data in the test recording region 4 (see FIG. 1) of the medium 1, a recording condition storing circuit 410 having a memory such as a semiconductor memory and a hard disk and for storing an optimal recording condition, a pulse condition setting circuit 411 for controlling the laser pulse in accordance with the recording condition, and a moving mechanism 412 for moving the optical head 401 radially relative to the medium 1.

The controller 403 can be configured as a computer including the recording condition storing circuit 410 as a data memory. The program for defining operations of the computer is, for instance, stored in a program memory (not shown) such as an ROM in the controller 403. The program may be supplied through a recording medium such as an ROM, a flexible disk, a CD-ROM, and the information recording medium 1, or may be supplied through a transmission medium 416 such as a telephone line and a network.

The program recoded in the information recording medium 1 is read out by the optical head 401, and is storable in the program memory built in the controller 403, for example. The program recorded in the CD-ROM can be read out by connecting a CD-ROM reader (not shown) as an external device with an input/output interface (not shown). In case of supplying the program in the form of an ROM, the controller 403 can execute the process in accordance with the program by installing the ROM in the recording/reproducing apparatus 400 as a program memory built in the controller 403. By providing a communications circuit 415 in the recording/reproducing apparatus 400, the program supplied through the transmission medium 416 is received in the communications circuit 415 and is stored in the program memory built in the controller 403, for example. The transmission medium 416 may be wired or wireless.

The entirety or a part of an apparatus section IC1 encircled with the alternate one long and two short dash line in FIG. 3 can be configured by a single-chip LSI. In case of constituting a part of the apparatus section IC1 by a single-chip LSI, various components of the apparatus section IC1 can be optionally selected as the part to be constituted by the single-chip. Apparatus sections IC2 and IC3 shown in FIG. 3 are merely some of the examples. It is also possible to constitute plural parts in the apparatus section IC1 by single-chip LSIs, respectively.

Figure 4:
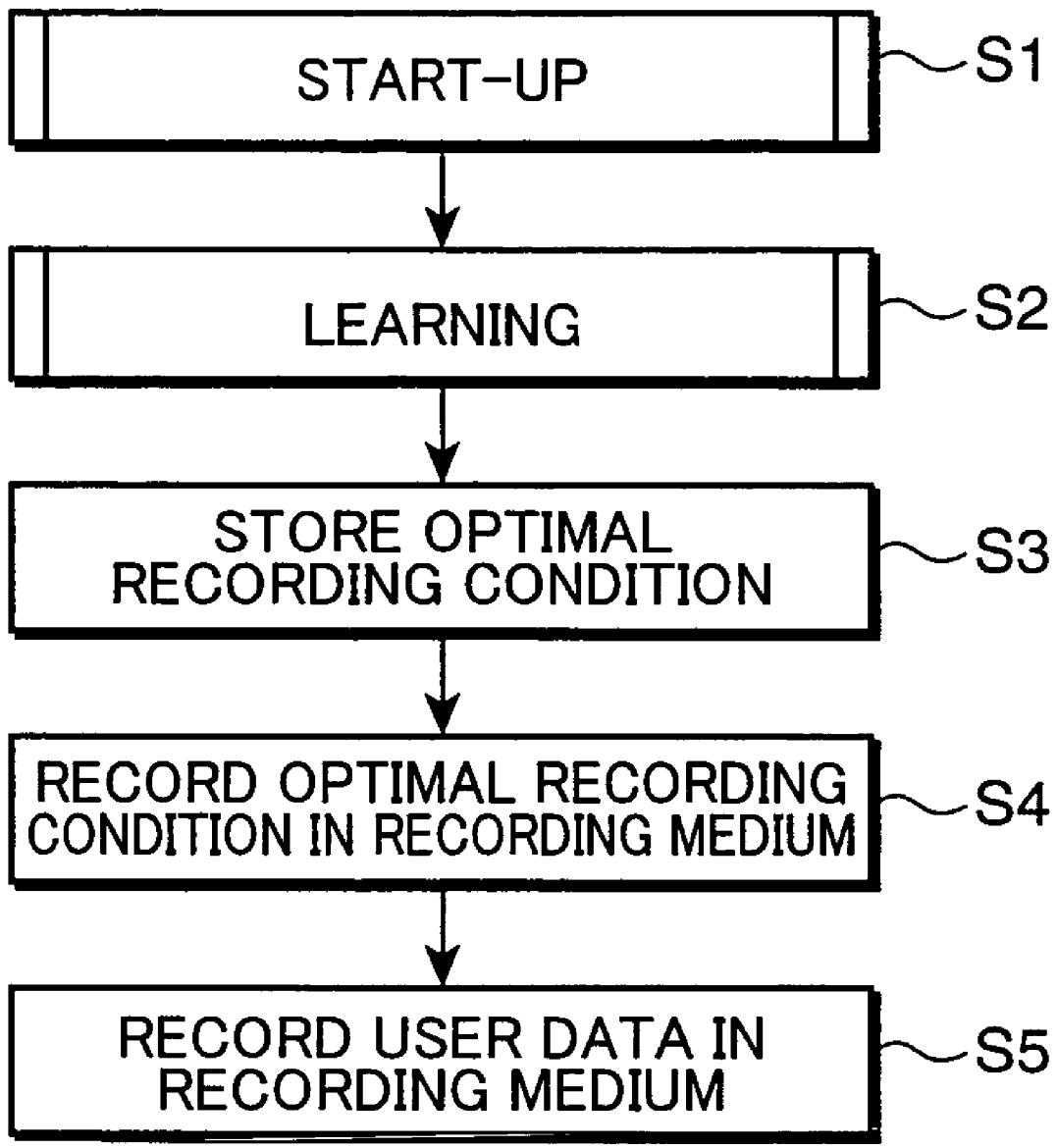
FIG. 4 is a flowchart showing a procedure of processes by the apparatus shown in FIG. 3.
Figure 5:
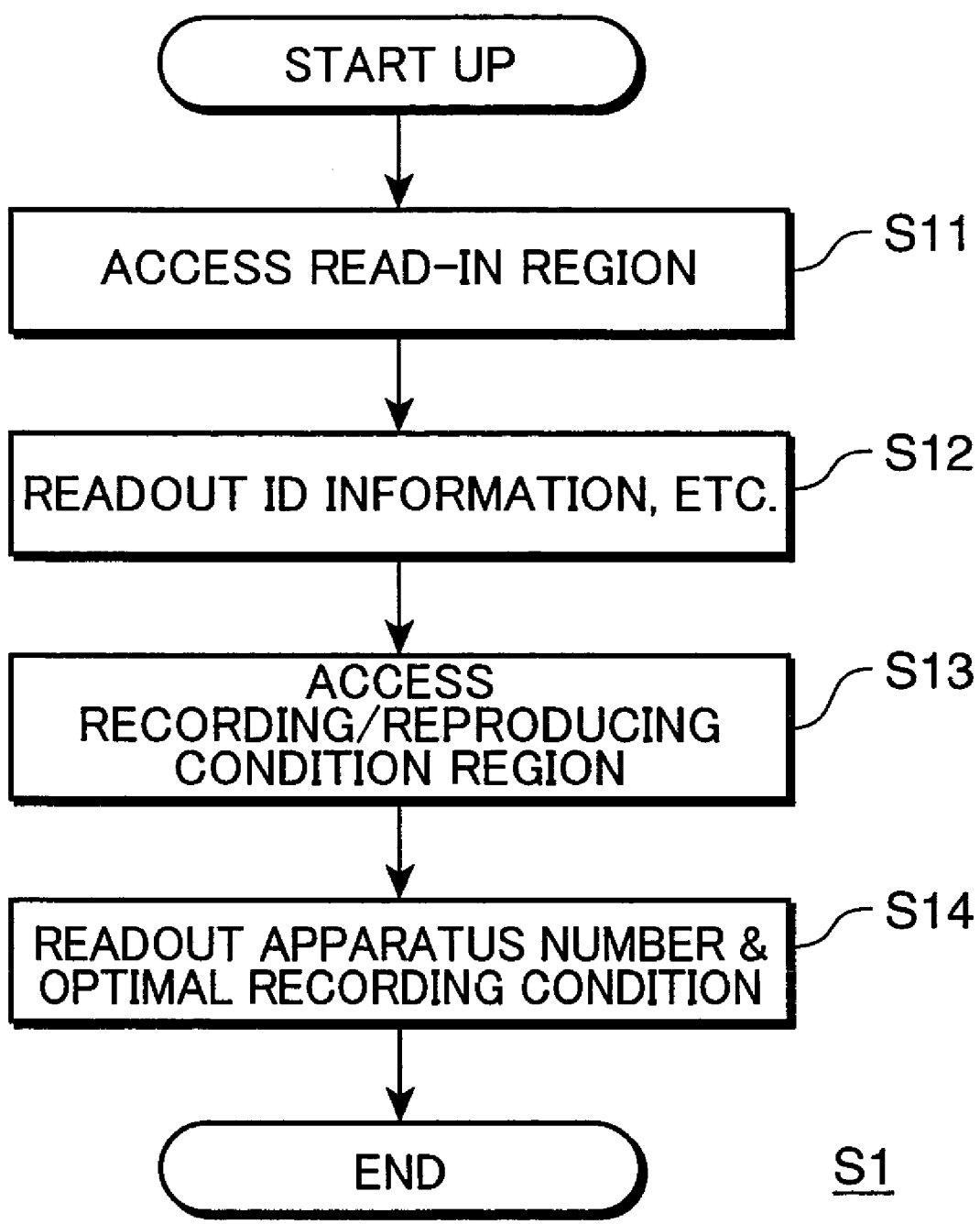
FIG. 5 is a flowchart showing a procedure of the process in Step S1 in FIG. 4.

FIG. 4 is a flowchart showing a method of recording information with use of the recording/reproducing apparatus 400. The recording method is described also with reference to FIG. 3. First, in Step S1, the recording/reproducing apparatus 400 is started up. Specifically, as shown in FIG. 5, when the information recording medium 1 is mounted on the spindle motor 402, the recording/reproducing apparatus 400 drives, while rotating the medium 1, the optical head 401 to irradiate laser light onto the medium 1 for information reproduction in such a manner that the laser light is focused on the recording layer 9 so as to access the read-in region 3 (Step S11). Next, the irradiated laser beam is operative to track the information track to read out ID information of identifying the information recording medium 1, etc. (Step S12). Thereafter, the laser light accesses the recording/reproducing condition recording region 5 (Step S13) to read out the optimal recording condition which has been recorded in the recording/reproducing condition recording region 5, along with the apparatus number of specifying the recording/reproducing apparatus 400 (Step S14). The ID information and the like is read out in such a manner that the information reproducing signal 406S acquired from the reflected light from the medium 1 by driving of the optical head 401 is converted into the digitized signal 407S by the binary circuit 407, and the digitized signal 407S is demodulated into data by the data demodulating circuit 408 for outputting to the controller 403.

Referring back to FIG. 4, the learning operation of determining the optimal recording condition is implemented in Step S2. The learning operation is conducted by the procedure shown in FIG. 6. First, the recording/reproducing apparatus 400 moves the optical head 401 to such a position as to allow the optical head 401 to access the test recording region 4 of the recording layer 9 (Step S21). Then, the controller 403 causes the pulse condition setting circuit 411 to set the optimal recording condition read out in Step S14 (See FIG. 5) (Step S22). As regards the parameter which has not been defined as the optimal condition, a predetermined condition, or the condition designated by the ID information read out in Step S12 (see FIG. 5) is set.

Subsequently, specific data for learning operation which has been outputted from the controller 403 is converted into a laser driving signal by the modulator 404, and the laser driving circuit 405 drives the semiconductor laser equipped on the optical head 401 in accordance with the laser driving signal. The light emitted from the semiconductor laser is condensed on the information recording medium 1 by the optical head 401, and a test signal is recorded in the test recording region 4 (Step S23). Next, the recorded trial data is reproduced (Step S24), and the signal quality judging circuit 409 measures the jitter value of the reproduction signal (namely, displacement of the position of the reproduced signal relative to the reference clock) to judge the quality of the signal based on a comparison between a predetermined judgment criteria and the measured jitter value (Step S25).

If the jitter value satisfies the judgment criteria (YES in Step S26), the learning result is sent to the controller 403, and the learning operation is terminated. If the jitter value does not satisfy the judgment criteria (NO in Step S26), the pulse condition is altered (Step S27). The process in Step S27 is conducted when the controller 403 causes the pulse condition setting circuit 411 to set the altered pulse condition. Thereafter, specific data is recorded as trial data (Step S23), and judgment regarding the signal quality of the recorded trial data is conducted (Steps S24 and S25). These steps are cyclically repeated until the judgment criteria is satisfied. Thus, the optimal recording condition is determined.

Referring back to FIG. 4 again, the optimal recording condition acquired by the learning operation in Step S2 is stored in the recording condition storing circuit 410 (Step S3). Then, the optimal recording condition is recorded in the recording/reproducing condition recording region 5 of the information recording medium 1, along with the apparatus number of specifying the recording/reproducing apparatus 400 (Step S4). Next, the controller 403 causes the pulse condition setting circuit 411 to set the pulse condition based on the optimal recording condition (Step S5). Thus, user data is ready to be recordable in the information recording region 6 in the optimal recording condition. The pulse condition includes the intensity, width (time length), and generation timing of the laser pulse, and is determined depending on the length of the mark to be recorded and the length of the space. The waveform of the modulated laser light (waveform of emitted light) in recording is determined depending on the signal pattern of the data to be recorded, and the pulse condition.

Figure 7:
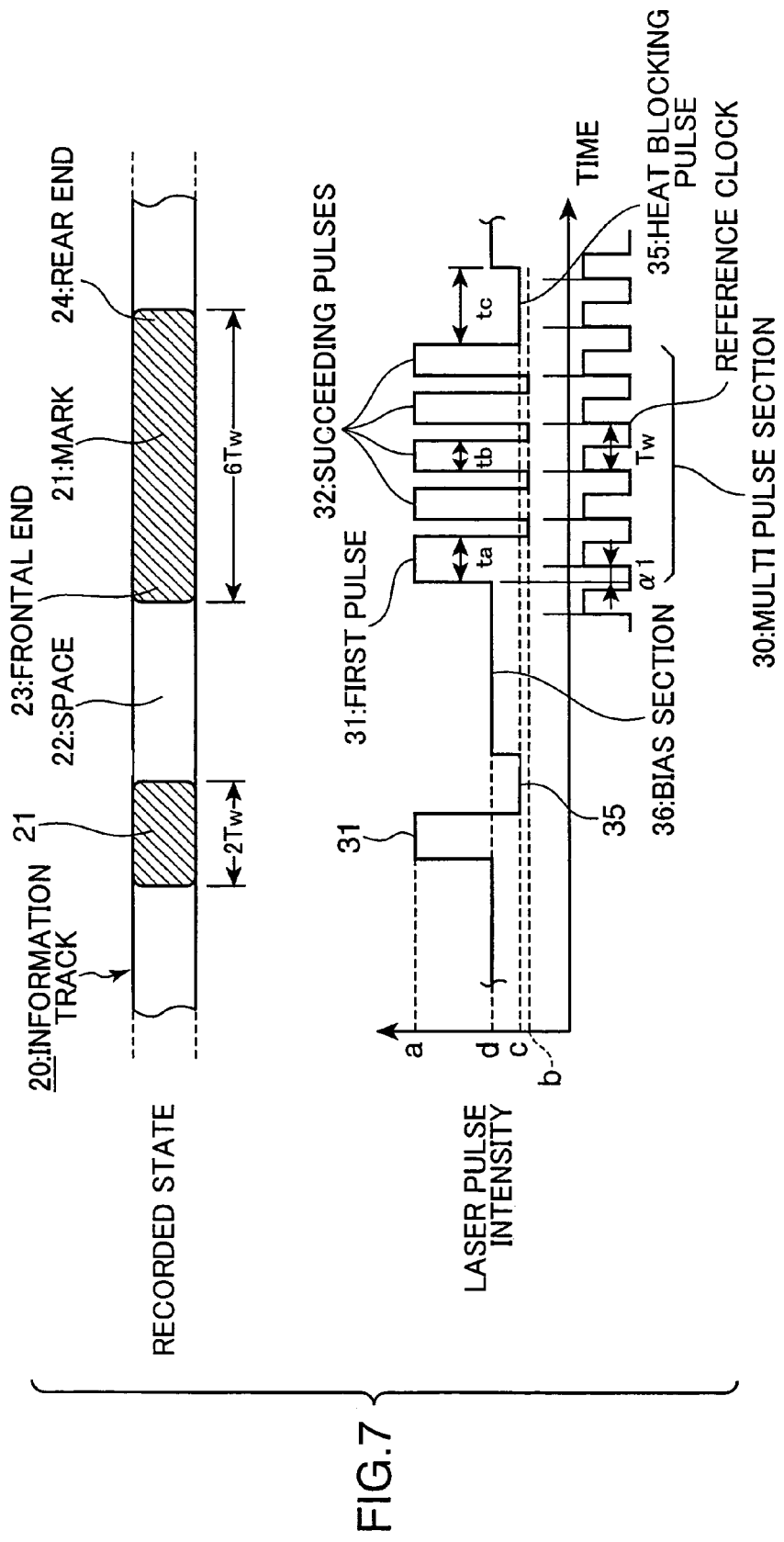
FIG. 7 is a waveform diagram showing a modulated waveform of laser light emitted from the apparatus shown in FIG. 4.

FIG. 7 is a waveform diagram showing a modulated waveform of laser light in accordance with an embodiment of the recording apparatus of the present invention. Signal patterns to be recorded are combinations of a certain number of marks 21, and a certain number of spaces 22, in which each mark 21 has a length corresponding to an integral multiple of a reference clock cycle (also called as "window width") Tw within a range from 2Tw to 8Tw. The signal pattern is formulated based on a standard modulating method. FIG. 7 shows a modulated waveform of laser light in case of forming a signal pattern including the mark 21 having the length 2Tw and the mark 21 having the length 6Tw.

According to the modulated waveform of laser light, in the mark forming portion corresponding to the mark 21 having the length nTw ($2 \leq n \leq 8$), there is generated a multi pulse section 30 comprising pulses of the number (n−1) which are modulated between the power level a and the power level b (b<a). Specifically, the multi pulse section 30 consists of pulses of the number (n−1) having the power level a, and pulses of the number (n−2) having the power level b, in which each of the pulses having the power level b is provided between the adjoining pulses having the power level a. If n=2, namely, the pulse having the power level a is only one, there exists no pulse having the power level b. Among the pulses of the number (n−1) having the power level a, the pulse corresponding to the frontal end 23 of the mark 21 is referred to as "first pulse 31", and the pulses of the number (n−2) that are generated following the first pulse 31 are referred to as "succeeding pulses 32". The succeeding pulses 32 are not included in the multi pulse section 30 where n=2.

In the modulated waveform of laser light, a heat blocking pulse 35 having a power level c (c<a) is generated immediately after the multi pulse section 30. Further, there is generated a bias section 36 having a power level d (c<d<a) between the heat blocking pulse 35 and the succeeding multi pulse section 30. The bias section 36 corresponds to the space 22.

Referring to FIG. 7, ta, tb, and tc respectively represent pulse widths (time lengths) of the first pulse 31, the succeeding pulse 32, and the heat blocking pulse 35. The symbol a1 represents a time duration from the timing of starting emitting the first pulse 31 to the reference clock. The timing of starting emitting the succeeding pulse 32 coincides with the reference clock.

The inventors conducted recording tests by using the WORM type optical information recording medium 1 shown in FIG. 2, and the recording/reproducing apparatus 400 shown in FIG. 3. The respective parameters in the pulse condition were identical to each other among all the marks of different lengths.

Figure 8:
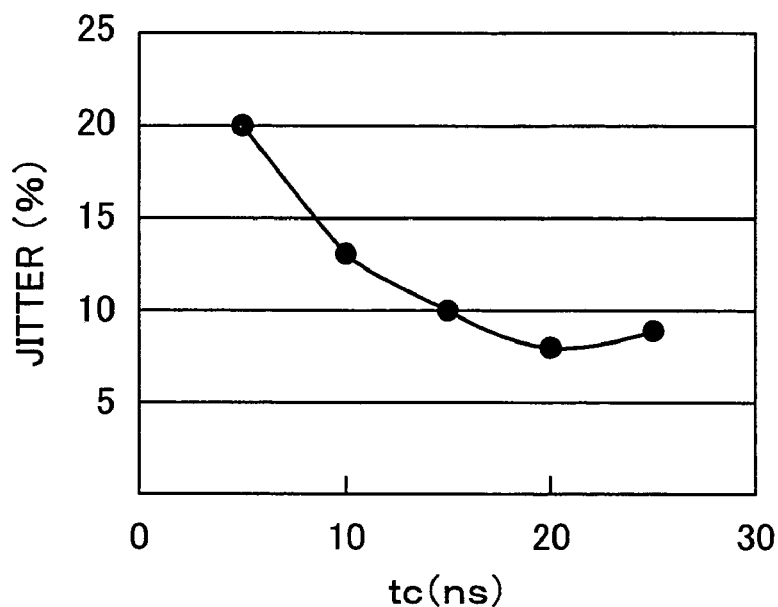
FIG. 8 is a graph showing a result of a recording test using the modulated waveform shown in FIG. 7.

The inventors recorded random signal patterns while altering the parameters in the pulse condition at the linear velocity=5 m/s, and Tw=15 ns, and measured jitters of the reproduction signals. As a result of the recording test, a minimal jitter was obtained when the respective power levels a, b, c, and d were: a=5.5 mW, b=c=0 mW, d=1.8 mW, and the respective time lengths were: $\alpha 1$=1 ns, ta=8 ns, tb=7 ns, tc=20 ns. FIG. 8 is a graph showing a relation between the time length tc of the heat blocking pulse 35, and the jitter of reproduction signal in the recording test. In FIG. 8, the ratio of jitter to the reference clock cycle Tw is shown in terms of percentage. Generally, it is conceived that the data can be precisely demodulated from the reproduction signals, if the jitter is 10% or lower. As shown in FIG. 8, there is found a correlation between the time length tc and the jitter. Specifically, if tc is not smaller than 15 ns, the jitter is 10% or lower, and if tc is 20 ns, the jitter is minimal.

Figure 9:
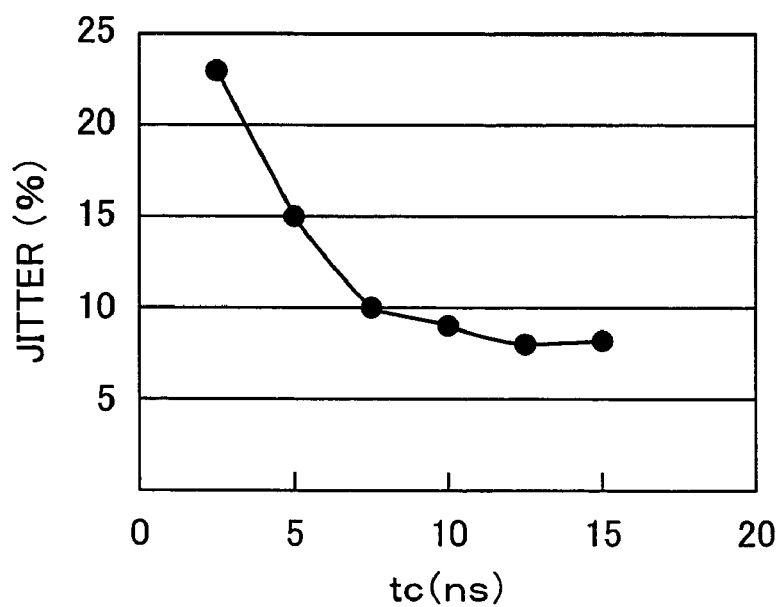
FIG. 9 is a graph showing a result of another recording test using the modulated waveform shown in FIG. 7.

Next, a recording test similar to the above was conducted while altering the parameters in the pulse condition at the linear velocity=10 m/s, and Tw=7.5 ns. As a result of the recording test, a minimal jitter was obtained when the respective power levels a, b, c, and d were: a=7.5 mW, b=c=0 mW, d=2.5 mW, and the respective time lengths were: $\alpha 1$=1 ns, ta=5 ns, tb=4 ns, tc=12.5 to 15 ns. FIG. 9 is a graph showing a relation between the time length tc of the heating blocking pulse 35, and the jitter of reproduction signal. As shown in FIG. 9, there is found a correlation between the time length tc and the jitter. Specifically, if tc is not smaller than 7.5 ns, the jitter is 10% or lower, and if tc is from 12.5 to 15 ns, a minimal jitter is obtained.

It is concluded that a preferable time length tc relative to the reference clock cycle Tw of the signal to be recorded is: tc≧Tw in the linear velocities of 5 m/s and 10 m/s. In the recording wavelength suitable for the conventional erasable type optical recording medium recited in D1, for example, a preferred time length of the heat blocking pulse ranges between 0.5Tw and 1Tw. On the other hand, a preferred time length of the heat blocking pulse 35 in the embodiment of the present invention is not smaller than 1Tw. Thus, the preferred range of the reference clock cycle Tw greatly differs between the embodiment of the present invention and the conventional arrangement. Conceivably, this is because whereas the recording medium of erasable type (namely, rewritable type) is constructed such that recording marks are formed by rapidly cooling the recording layer after heating the recording layer to the melting point thereof or higher, the WORM type medium 1 is constructed such that recording marks are formed by partially transforming the recording layer 9 (see FIG. 2) into a crystalline state by heating the recording layer 9 to the crystallization temperature or higher, which is considerably lower than the melting point of the recording layer. Accordingly, the WORM type information recording medium 1 is likely to be susceptible to heat transfer from the mark 21 which has been formed immediately before the target mark 21 being formed. Taking this into consideration, applying the recording method: tc≧Tw in the above arrangement enables to carry out desirable information recording/reproduction for the WORM type information recording medium 1 in which the recording marks 21 are formed by partially transforming the recording layer 9 into a crystalline state.

In the aforementioned two demonstration tests where the linear velocity and the reference clock cycle Tw are differentiated from each other, the linear length of the information track 20 corresponding to the reference clock cycle Tw is: 5 ms×15 ns=10 m/s×7.5 ns=75 nm, which is identical to each other in the two demonstration tests. Therefore, it is concluded that the optimal condition for the linear length Lc corresponding to the time length tc of the heat blocking pulse 35, namely, the recording length of the heat blocking pulse 35 is: Lc≧75 nm.

Figure 6:
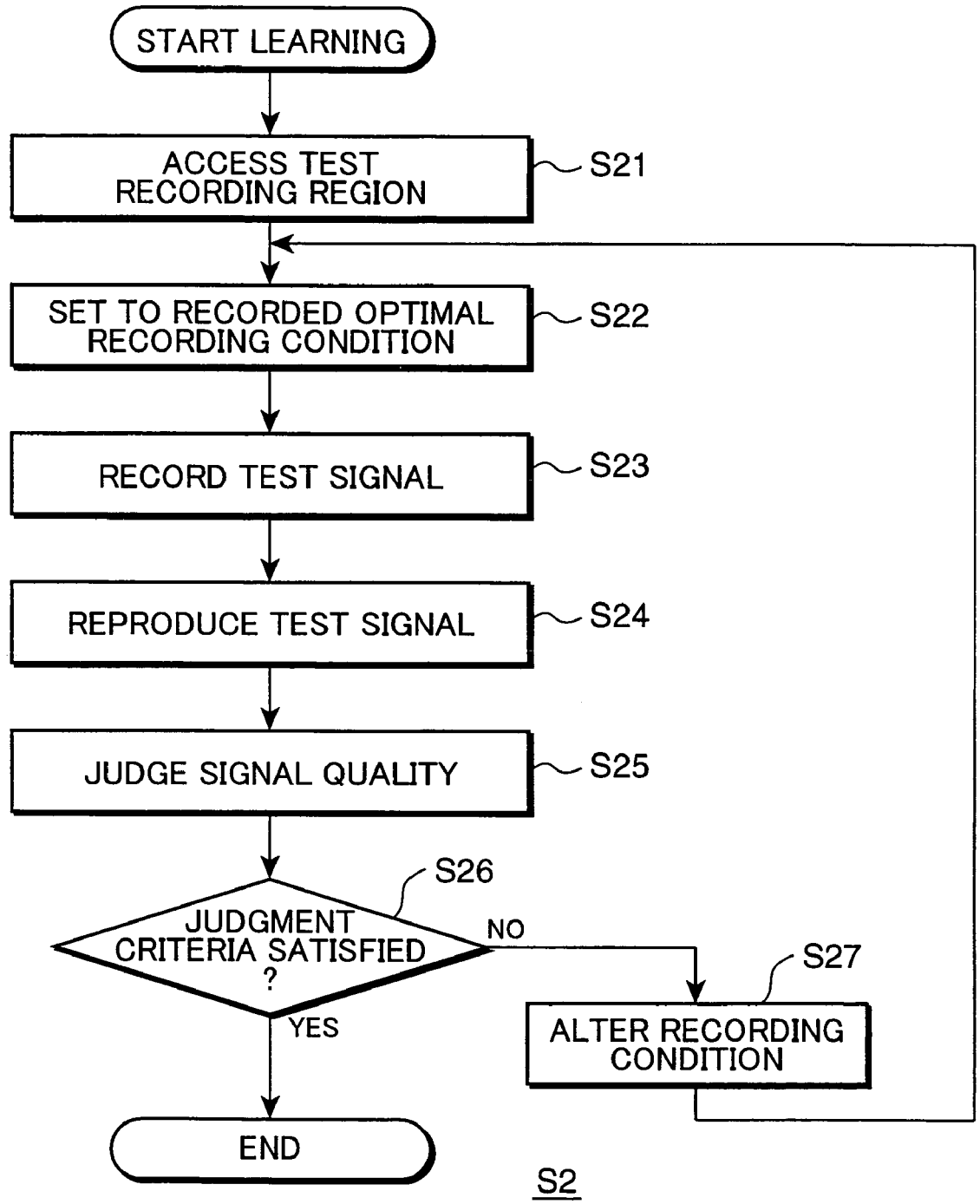
FIG. 6 is a flowchart showing a procedure of the process in Step S2 in FIG. 4.

The pulse condition for the recording/reproducing apparatus 400 can be optimized to the aforementioned condition in the learning operation in Step S2 (see FIGS. 4 and 6). For instance, in the demonstration tests, the respective parameters in the pulse condition are identical to each other among all the marks of different lengths. Alternatively, the time length tc (or the linear length Lc) of the heat blocking pulse 35 may be varied depending on the length of the space 22 which follows immediately after the heat blocking pulse 35, as far as the optimal condition: tc≧Tw (or Lc≧75 nm) is satisfied. In such an arrangement, it is desirable to increase the time length tc of the heat blocking pulse 35 as the length of the space 22 which follows immediately after the heat blocking pulse 35 is decreased. Thereby, heat generated during formation of the mark 21 can be uniformly transferred to the succeeding mark 21 in various signal patterns, and information recording of good quality can be accomplished.

Further alternatively, it may be possible to alter the time length tc (or the linear length Lc) of the heat blocking pulse 35 depending on the length of the mark 21 immediately before the heat blocking pulse 35. In such an altered arrangement, it is desirable to increase the time length tc of the heat blocking pulse 35 as the length of the mark 21 immediately before the heat blocking pulse 35 is increased. Thereby, heat generated during formation of the mark 21 can be more uniformly transferred to the succeeding mark 21 in various signal patterns, and information recording of good quality can be accomplished.

In the demonstration tests, the power level c of the heat blocking pulse 35 is set to a fixed value, and is also set substantially identical to the power level b of the multi pulse section 30. Alternatively, the power level c of the heat blocking pulse 35 may be varied depending on the length of the space 22 which immediately follows the heat blocking pulse 35. In such an altered arrangement, it is desirable to decrease the power level c of the heat blocking pulse 35 as the length of the space 22 immediately after the heat blocking pulse 35 is decreased. Thereby, heat generated during formation of the mark 21 can be uniformly transferred to the succeeding mark 21 in various signal patterns, and information recording of good quality can be accomplished.

Further alternatively, it may be possible to vary the power level c of the heat blocking pulse 35 depending on the length of the mark 21 immediately before the heat blocking pulse 35. In such an altered arrangement, lowering the power level c of the heat blocking pulse 35 as the length of the mark 21 immediately before the heat blocking pulse 35 is increased enables to more uniformly transfer the heat generated during formation of the mark 21 to the succeeding mark 21 and to accomplish information recording of good quality.

As a further altered form, it may be possible to vary the time length tc or the power level c of the heat blocking pulse 35 depending both on the length of the mark 21 immediately before the heat blocking pulse 35 and on the length of the space 22 immediately after the heat blocking pulse 35. Thereby, similarly to the aforementioned embodiment, information recording of good quality is accomplished.

The modulated wavelength as shown in FIG. 7 is accomplished by causing the controller 403 to control the modulator 404. Further, the conditions such as the power levels a, b, c, and d, and the time length tc are determined by causing the pulse condition setting circuit 411 to set these conditions, based on the recording condition stored in the recording condition storing circuit 410, under the control of the controller 403 (see Step S5 in FIG. 4). Further, the power levels a, b, c, and d, and the time length tc (or tc obtained by converting the linear length Lc depending on the linear velocity) are recorded in the recording medium 1 as optimal conditions in Step S4 (see FIG. 4).

Theoretically, the above-mentioned optimal condition: tc≧Tw or Lc≧75 nm may depend on the other pulse conditions such as a, b, and d, or α1, ta, tb, and tc. Nevertheless, an overall thermal load is substantially equivalent in any of the combinations with a recording condition capable of securing a possible most preferable reproduction signal, and the condition regarding the heat blocking pulse 35 is confined to a specific range. Therefore, the optimal condition under practical use has been defined as mentioned above.

Figure 10:
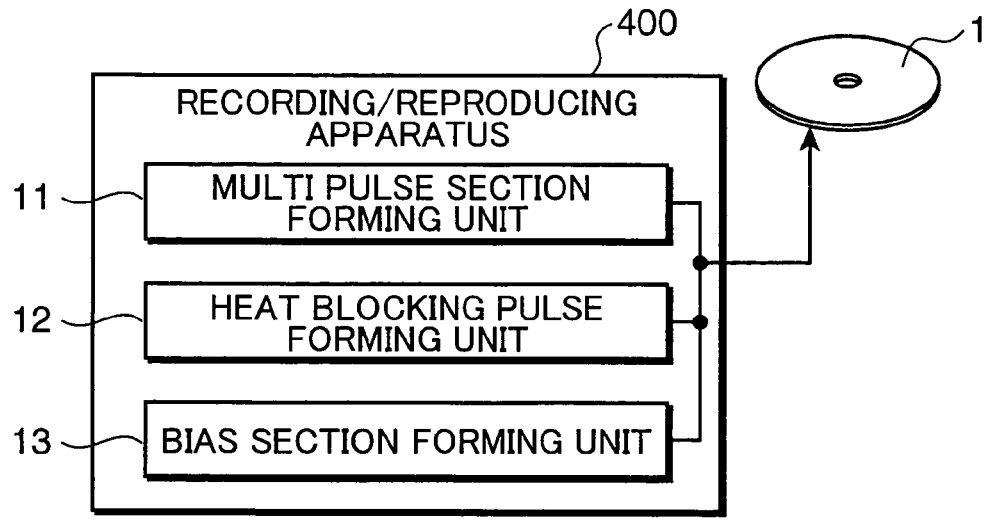
FIG. 10 is a block diagram of the recording apparatus in accordance with the first embodiment of the present invention depicted at a view point of the information recording function.

Taking into consideration the function of recording information in the information recording medium 1 by the recording/reproducing apparatus 400 in accordance with the first embodiment, namely, the processes in Step 5 in FIG. 4 and Step 23 in FIG. 6, the configuration of the recording/reproducing apparatus 400 can be expressed by the block diagram as shown in FIG. 10. In other words, the controller 403, the modulator 404, and the other circuits constituting the recording/reproducing apparatus 400 realize a multi pulse section forming unit 11, a heat blocking pulse forming unit 12, and a bias section forming unit 13.

Figure 11:
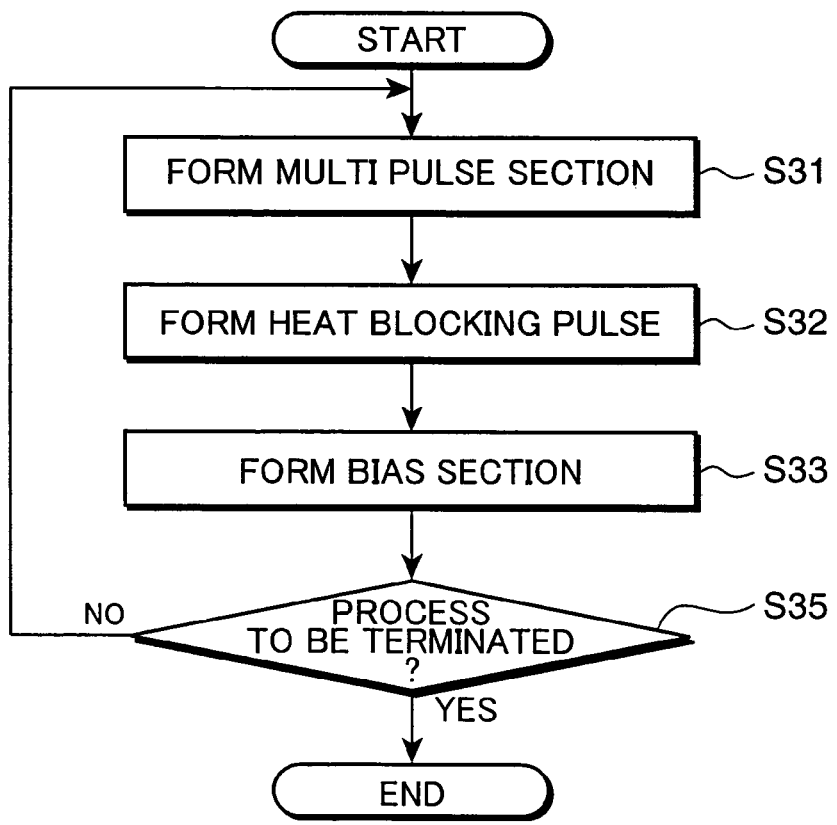
FIG. 11 is a flowchart showing a procedure of the information recording process performed by the recording apparatus in accordance with the first embodiment of the present invention.

The multi pulse section forming unit 11, the heat blocking pulse forming unit 12, and the bias section forming unit 13 implement the process according to the flowchart shown in FIG. 11. Specifically, when the process of recording information in the information recording medium 1 is started, the multi pulse section forming unit 11 modulates the light beam to form the multi pulse section 30 (Step S31). Next, the heat blocking pulse forming unit 12 modulates the light beam to form the heat blocking pulse 35 (Step S32). Subsequently, the bias section forming unit 13 modulates the light beam to form the bias section 36 (Step S33). If it is judged that the process is to be terminated such as a case that there is no information to be recorded (YES in Step S35), the process in FIG. 11 is terminated. On the other hand, if it is judged that the process is not to be terminated (NO in Step S35), the process returns to Step S31. In this way, information is recorded in the information recording medium 1.

As mentioned above, the recording/reproducing apparatus 400 optimizes the pulse condition in the learning operation in Step S2 (see FIGS. 4 and 6). During this period, the heat blocking pulse forming unit 12 optimizes the time length tc (or the linear length Lc) and the power level c of the heat blocking pulse 35.

Further, as mentioned above, the controller 403 can be configured as the computer including the recording condition storing circuit 410, for example. Thereby, the process by the controller 403 can be easily realized. The program for defining the operations of the computer realizes the multi pulse section forming unit 11, the heat blocking pulse forming unit 12, and the bias section forming unit 13 as shown in FIG. 10, by cooperation with the hardware resources such as the modulator 404, the laser driving circuit 405, and the pulse condition setting circuit 411, which belong to the peripheral circuits of the computer, in addition to the hardware resources such as a CPU and a memory built in the controller 403 serving as the computer, as well as the recording condition storing circuit 410 serving as a data memory of the computer.

Second Embodiment

Figure 12:
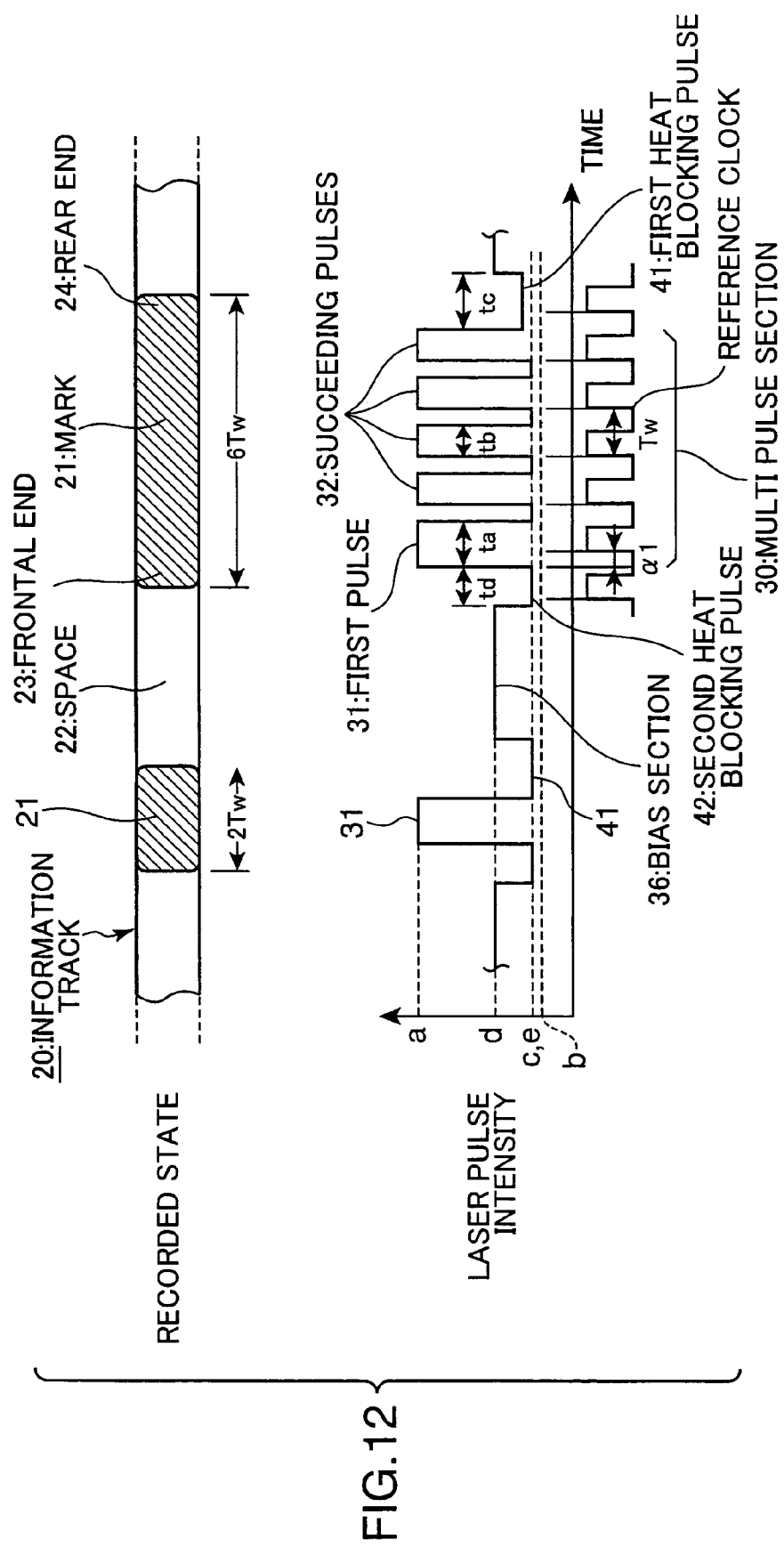
FIG. 12 is a diagram showing a modulated waveform of laser light emitted from a recording apparatus in accordance with a second embodiment of the present invention.

FIG. 12 is a waveform diagram showing a modulated waveform of laser light by a recording method in accordance with a second embodiment of the present invention. Signal patterns to be recorded are combinations of marks 21 and spaces 22, in which each mark 21 has a length corresponding to an integral multiple of the reference clock cycle Tw within a range from 2Tw to 8Tw. The signal pattern is formulated based on a standard modulating method. FIG. 12 shows a modulated waveform of laser light in case of forming a signal pattern including the mark 21 having the length 2Tw and the mark 21 having the length 6Tw. According to the modulated waveform of laser light, in the mark forming portion corresponding to the mark 21 having the length nTw (n≧2), there is generated a multi pulse section 30, as having been described referring to FIG. 7.

In the laser light modulated waveform, a first heat blocking pulse 41 having a power level c (c<a) is generated immediately after the multi pulse section 30. Further, there is generated a second heat blocking pulse 42 having a power level e (e<a) immediately before the multi pulse section 30. A bias section 36 having a power level d (c, e<d<a) is generated between the first heat blocking pulse 41 and the second heat blocking pulse 42. The bias section 36 corresponds to the space 22. In FIG. 12, ta tb, tc, and td respectively represent time lengths of a first pulse 31, a succeeding pulse 32, the first heat blocking pulse 41, and the second heat blocking pulse 42. Similarly to the arrangement shown in FIG. 7, the timing of starting emitting the succeeding pulse 32 coincides with the reference clock.

A relation between the sum of the time widths tc and td, and the reference clock cycle Tw: $tc+td \geq Tw$ when $c=e$ is theoretically and securely derived as the optimal condition regarding the first heat blocking pulse 41 and the second heat blocking pulse 42 which are respectively so located after and before the space 22 that the bias section 36 is formed therebetween, based on the optimal condition defined in the first embodiment. Similarly to the first embodiment, $Lc+Ld \geq 75$ nm, as the optimal condition, is derived with respect to the linear length Lc of the first heat blocking pulse 41, and the linear length Ld of the second heat blocking pulse 42. Setting the respective parameters as mentioned above enables to keep heat generated during formation of the mark 21 from transferring to the succeeding mark 21, and to accomplish desirable recording/reproduction of information in the WORM type information recording medium 1 in which the recording marks 21 are formed by partially transforming the recording layer 9 to a crystalline state.

As mentioned above, there are provided the two heat blocking pulses in forming one mark 21, in which the one of the two heat blocking pulses is located before the space 22 and the other one thereof is located after the space 22. This arrangement enables to vary the distribution of the time lengths of the two heat blocking pulses 41, 42 while keeping the sum of the time lengths of the heat blocking pulses 41, 42 constant. In other words, this arrangement makes it possible to more finely control the temperature rise in the front part and the rear part of the multi pulse section 30, thereby accomplishing information recording of good quality.

It may be possible to vary the time lengths of the first heat blocking pulse 41 and the second heat blocking pulse 42 which are located before and after the space 22, depending on the length of the space 22. In such an altered arrangement, it is desirable to increase the sum (tc+td) of the time lengths of the first and second heat blocking pulses 41 and 42 as the length of the space 22 is decreased. Thereby, heat generated during formation of the mark 21 can be uniformly transferred to the succeeding mark 21 in various signal patterns, and information recording of good quality can be accomplished.

Further alternatively, it may be possible to vary the time lengths of the first and second heat blocking pulses 41 and 42 which are located before and after the space 22 following the mark 21, depending on the length of the mark 21. In such an altered arrangement, it is desirable to increase the sum (tc+td) of the time lengths of the first and second heat blocking pulses 41 and 42 as the length of the mark 21 immediately before the first heat blocking pulse 41 is increased. Thereby, heat generated during formation of the mark 21 can be more uniformly transferred to the succeeding mark 21 in various signal patterns, and information recording of good quality can be accomplished.

As another altered form, it may be possible to vary the power levels of the first and second heat blocking pulses 41 and 42 which are located before and after the space 22, depending on the length of the space 22. In such an altered arrangement, it is desirable to decrease the power level c of the first heat blocking pulse 41 and the power level e of the second heat blocking pulse 42 as the length of the space 22 is decreased. Thereby, heat generated during formation of the mark 21 can be uniformly transferred to the succeeding mark 21 in various signal patterns, and information recording of good quality can be accomplished. It should be noted that an equivalent effect is obtainable by lowering either one of the power levels c and e as the length of the space 22 is decreased.

As a still another altered form, it may be possible to alter the power levels of the first and second heat blocking pulses 41 and 42 which are located before and after the space 22 following the mark 21, depending on the length of the mark 21. In such an altered arrangement, it is desirable to decrease the power level c of the first heat blocking pulse 41 and the power level e of the second heat blocking pulse 42 as the length of the mark 21 immediately before the first heat blocking pulse 41 is increased. Thereby, heat generated during formation of the mark 21 can be more uniformly transferred to the succeeding mark 21 in various signal patterns, and information recording of good quality can be accomplished. It should be noted that an equivalent effect is obtainable by lowering either one of the power levels c and e as the length of the mark 21 is increased.

As yet another altered form, it may be possible to vary the time lengths or the power levels of the first and second heat blocking pulses 41 and 42, depending both on the length of the mark 21 immediately before the first heat blocking pulse 41, and the length of the space 22 which is provided between the first and second heat blocking pulses 41 and 42. Thereby, information recording of good quality is accomplished in the similar manner as the foregoing embodiment.

The modulated waveform shown in FIG. 12 is realized by causing a controller 403 to control a modulator 404. Further, the pulse conditions such as the power levels a, b, c, d, and e, and the time lengths tc and td are determined by causing a pulse condition setting circuit 411 to set these conditions, based on the recording condition stored in a recording condition storing circuit 410, under the control of the controller 403 (see Step S5 in FIG. 4). Further, the power levels a, b, c, d, and e, and the time length tc (or tc obtained by converting the linear length Lc depending on the linear velocity), and the time length td (or td obtained by converting the linear length Ld depending on the linear velocity) are recorded in the recording medium 1 as optimal conditions in Step S4 (see FIG. 4).

Figure 13:
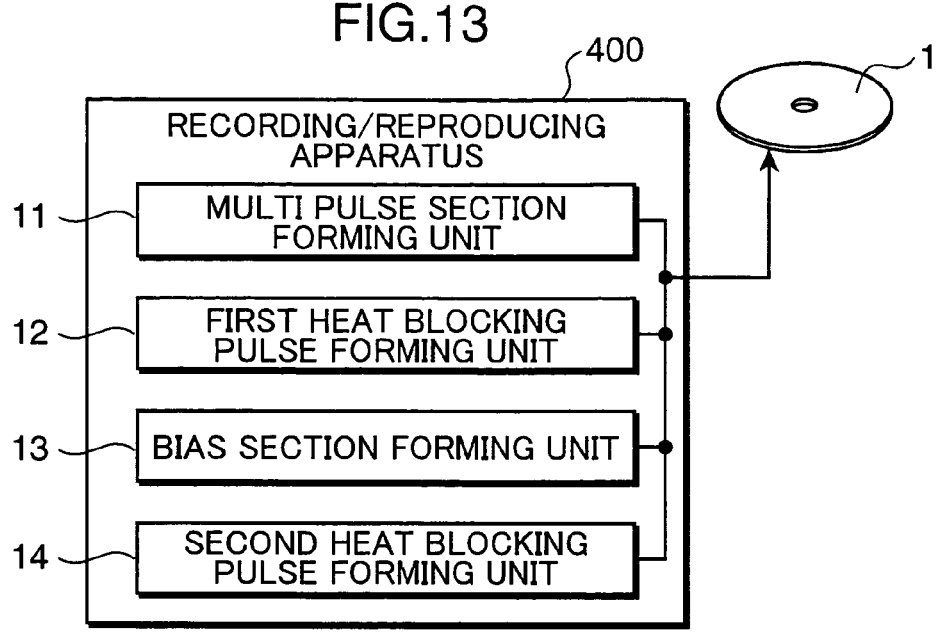
FIG. 13 is a block diagram of the recording apparatus in accordance with the second embodiment of the present invention depicted at a view point of the information recording function.

Taking into consideration the function of recording information in the information recording medium 1 by the recording/reproducing apparatus 400 in accordance with the second embodiment, namely, the processes in Step 5 in FIG. 4 and Step 23 in FIG. 6, the configuration of the recording/reproducing apparatus 400 can be expressed by the block diagram as shown in FIG. 13. In other words, the controller 403, the modulator 404, and the other circuits constituting the recording/reproducing apparatus 400 realize a multi pulse section forming unit 11, a first heat blocking pulse forming unit 12, a bias section forming unit 13, and a second heat blocking pulse forming unit 14. Elements in FIG. 13 which are identical or corresponding to those in FIG. 10 are denoted at the same reference numerals.

Figure 14:
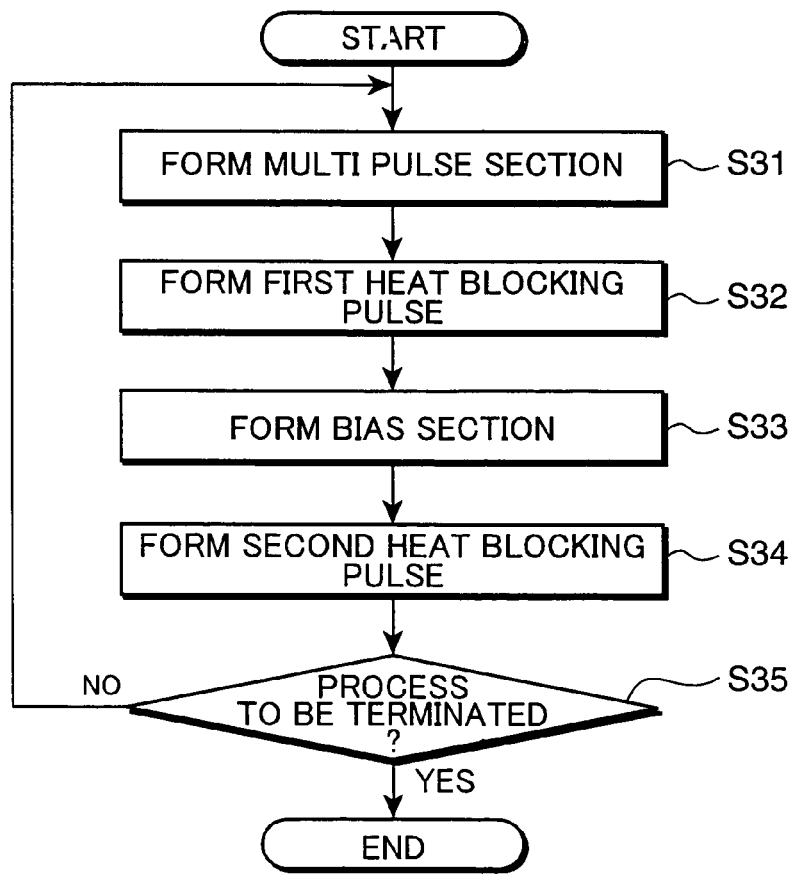
FIG. 14 is a flowchart showing a procedure of the information recording process performed by the recording apparatus in accordance with the second embodiment of the present invention.

The multi pulse section forming unit 11, the first heat blocking pulse forming unit 12, the bias section forming unit 13, and the second heat blocking pulse forming unit 14 implement the processes according to the flowchart shown in FIG. 14. Processes in FIG. 14 which are identical to or corresponding to those in FIG. 11 are denoted at the same step numbers. Specifically, when the process of recording information in the information recording medium 1 is started, the multi pulse section forming unit 11 modulates the light beam to form the multi pulse section 30 (Step S31). Next, the first heat blocking pulse forming unit 12 modulates the light beam to form the first heat blocking pulse 41 (Step S32). Subsequently, the bias section forming unit 13 modulates the light beam to form the bias section 36 (Step S33). Further, the second heat blocking pulse forming unit 14 modulates the light beam to form the second heat blocking pulse 42 (Step S34). If it is judged that the process is to be terminated such as a case that there is no information to be recorded (YES in Step S35), the process in FIG. 14 is terminated. On the other hand, if it is judged that the process is not to be terminated (NO in Step S35), the process returns to Step S31. In this way, information is recorded in the information recording medium 1.

As mentioned above, the recording/reproducing apparatus 400 optimizes the pulse condition in the learning operation in Step S2 (see FIGS. 4 and 6). During this period, the first heat blocking pulse forming unit 12 optimizes the time length tc (or the linear length Lc) and the power level c of the first heat blocking pulse 41. Also, the second heat blocking pulse forming unit 14 optimizes the time length td (or the linear length Ld) and the power level e of the second heat blocking pulse 42.

Further, as mentioned above, the controller 403 can be configured as the computer including the recording condition storing circuit 410, for example. Thereby, the process by the controller 403 can be easily realized. The program for defining the operations of the computer realizes the multi pulse section forming unit 11, the first heat blocking pulse forming unit 12, the bias section forming unit 13, and the second heat blocking pulse forming unit 14 as shown in FIG. 13, by cooperation with the hardware resources such as the modulator 404, the laser driving circuit 405, and the pulse condition setting circuit 411, which belong to the peripheral circuits of the computer, in addition to the hardware resources such as a CPU and a memory built in the controller 403 serving as the computer, as well as the recording condition storing circuit 410 serving as a data memory of the computer.

Third Embodiment

In the first and second embodiments, in the mark forming portion corresponding to the mark 21 having the length nTw ($2 \leq n \leq 8$), there is generated the multi pulse section 30 comprising the pulses of the number (n−1) having the power level a, and the pulses of the number (n−2) having the power level b, in which each of the pulses having the power level b is provided between the adjoining pulses having the power level a. Further, the timing of starting emitting the succeeding pulse 32 coincides with the reference clock, and the pulse width tb of the succeeding pulse 32 is set to: $tb \leq Tw$. Also, the first pulse 31 has the pulse width ta<Tw, similarly to the pulse width tb, even if the first pulse 31 may rise earlier than the reference clock.

Despite the above arrangements, a possibility should be considered that, in the future, the reference clock cycle Tw may be shortened in an attempt to raise the information recording rate into the information recording medium 1. Once the reference clock cycle Tw is shortened, the above constraint regarding the multi pulse section 30 may no longer be applicable. Specifically, it may be desirable to set the number of pulses having the power level a smaller than the number (n−1), or set the pulse width ta of the first pulse to: $ta \geq Tw$, or to set the pulse width tb of the succeeding pulse 32 to: $tb \geq Tw$.

Figure 15:
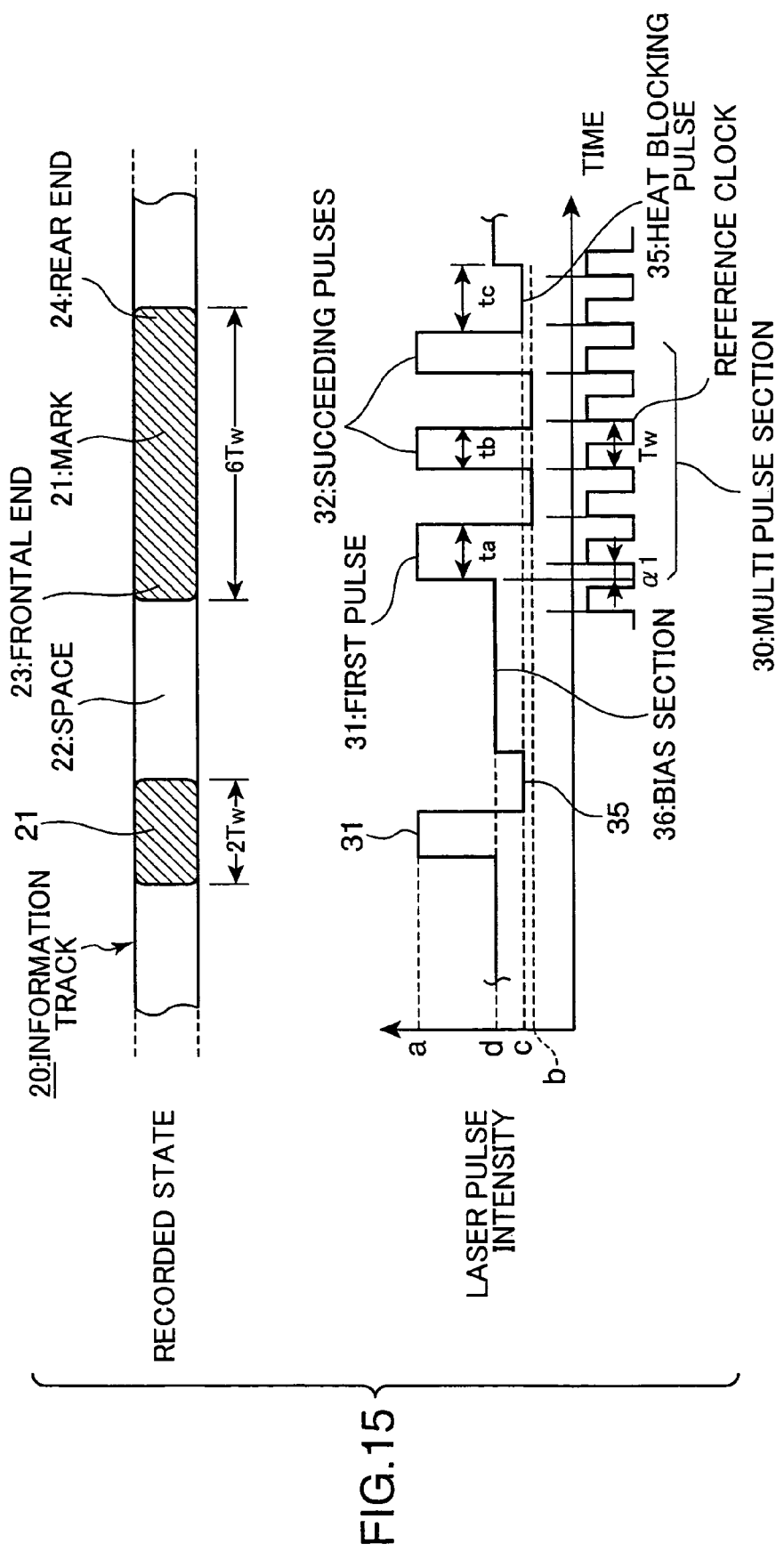
FIG. 15 is a diagram showing an example of modulated waveform of laser light emitted from a recording apparatus in accordance with a third embodiment of the present invention.
Figure 16:
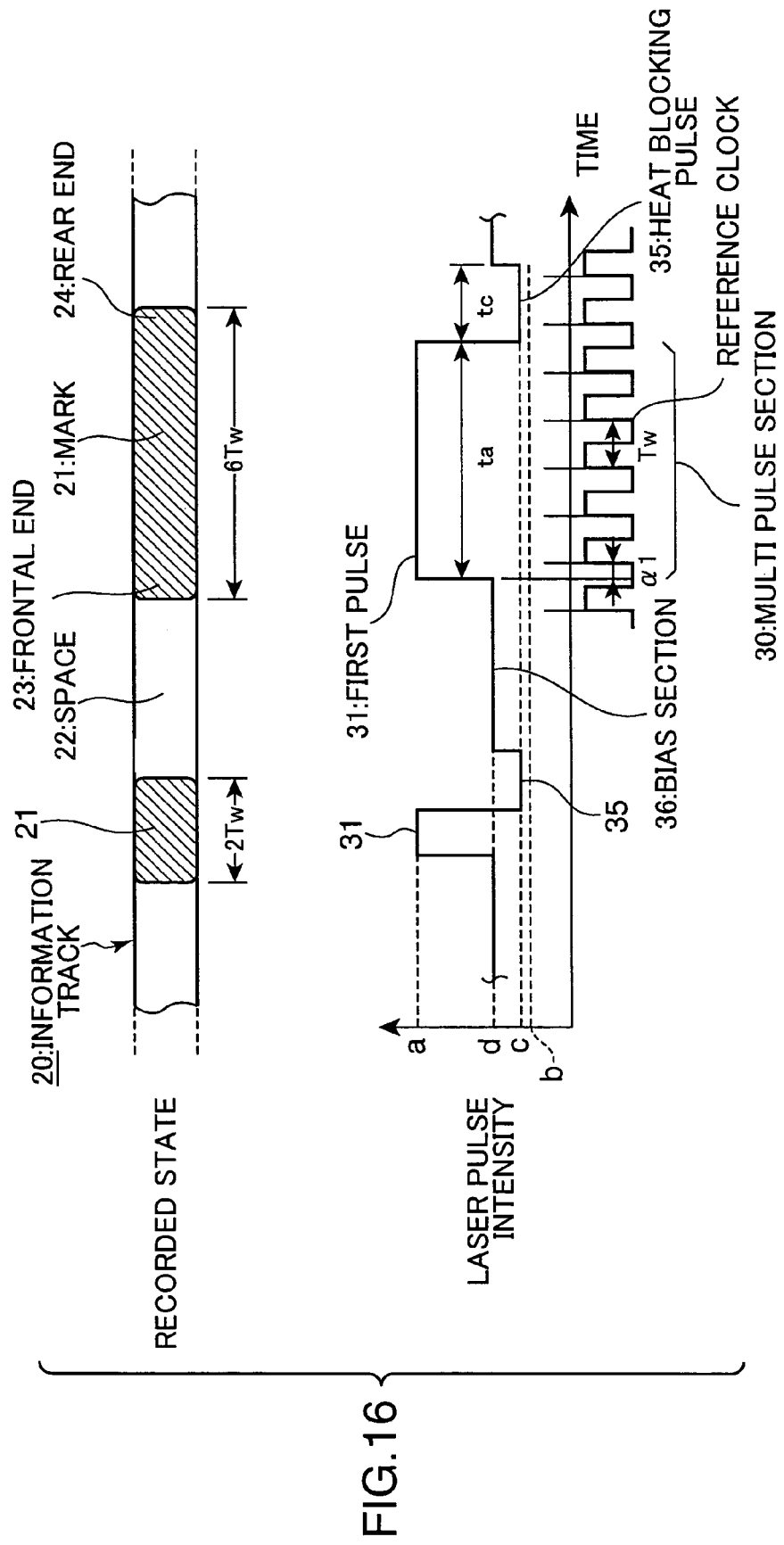
FIG. 16 is a diagram showing another example of modulated waveform of laser light emitted from the recording apparatus in accordance with the third embodiment of the present invention.
Figure 17:
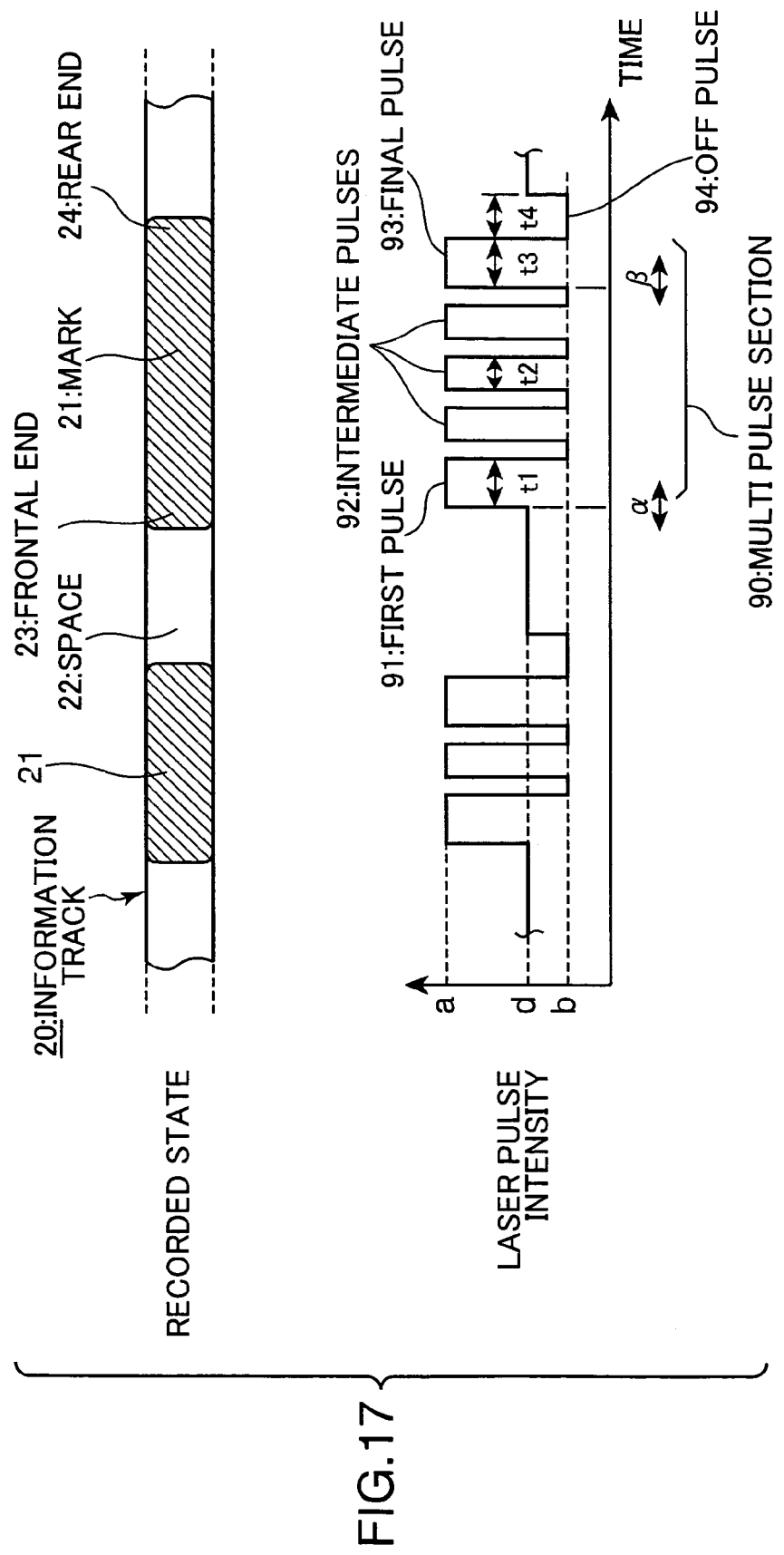
FIG. 17 is a diagram showing a modulated waveform of laser light emitted with use of a conventional recording technology.

FIGS. 15 and 16 are waveform diagrams of modulated laser light illustrating different waveforms from those in the first and second embodiments with respect to the multi pulse section 30. In the example of FIG. 15, there are provided two succeeding pulses 32 for a mark 21 having the length 6Tw. Thereby, the number of pulses having the power level a including the first pulse 31 and the succeeding pulses 32 are three, which is smaller than 5 (=n−1). The multi pulse section 30 shown in FIG. 15 has a waveform in which part is skipped from the succeeding pulses 32 of the number (n−2)=4, and the pulse width ta of the first pulse 31 has a duration slightly longer than the reference clock cycle Tw.

In the example of FIG. 16, the pulse width ta of the first pulse 31 is set much longer than the reference clock cycle Tw, the number of the succeeding pulses 32 is zero, and it is only one pulse, i.e., the first pulse 31 that has the power level a. In other words, the multi pulse section 30 shown in FIG. 16 has a single first pulse 31 over the plurality of reference clock cycles Tw. Thus, the present invention is not limited to the first and second embodiments, and can take various modifications and alterations regarding the pulse waveform of the multi pulse section 30, including the arrangements as exemplified in FIGS. 15 and 16.

Brief Description of the Embodiments

The following is a brief description on the embodiments of the present invention.

(1) An apparatus for recording information in a write-once-read-many type information recording medium by partially transforming a recording layer into a crystalline state by irradiation of a beam to form marks, modulates the beam to form a pulse train, the pulse train comprising: a multi pulse section including, in a portion where the mark is formed, a single pulse or a plurality of pulses each having a first power level a, and a pulse having a second power level b (b<a) between the adjoining pulses of the first power level a if the multi pulse section includes the plurality of pulses of the first power level a; a heat blocking pulse having a third power level c (c<a) immediately after the multi pulse section; and a bias section having a fourth power level d between the heat blocking pulse and a succeeding multi pulse section, and the pulse train being so formed that a time length tc of the heat blocking pulse and a reference clock cycle Tw of a signal to be recorded satisfy a relation: tc≧Tw, and the third power level c and the fourth power level d satisfy a relation: c<d.

In the recording apparatus (1), the beam is modulated so that the heat blocking pulse having a lower power level than that of the bias section formed between the multi pulse section and the next multi pulse section is formed between the multi pulse section and the bias section following the multi pulse section. Further, the time length of the heat blocking pulse is set in the optimal range. This arrangement enables to record user data precisely in the write-once-read-many (WORM) type information recording medium in which recording marks are formed by partially transforming the recording layer to a crystalline state.

(2) An apparatus for recording information in a write-once-read-many type information recording medium by partially transforming a recording layer into a crystalline state by irradiation of a beam to form marks, modulates the beam to form a pulse train, the pulse train comprising: a multi pulse section including, in a portion where the mark is formed, a single pulse or a plurality of pulses each having a first power level a, and a pulse having a second power level b (b<a) between the adjoining pulses of the first power level a if the multi pulse section includes the plurality of pulses of the first power level a; a heat blocking pulse having a third power level c (c<a) immediately after the multi pulse section; and a bias section having a fourth power level d between the heat blocking pulse and a succeeding multi pulse section, and the pulse train being so formed that a linear length Lc of the heat blocking pulse satisfies a relation: Lc≧=75 nm, and the third power level c and the fourth power level d satisfy a relation: c<d.

In the recording apparatus (2), the beam is modulated so that the heat blocking pulse having a lower power level than that of the bias section formed between the multi pulse section and the next multi pulse section is formed between the multi pulse section and the bias section following the multi pulse section. Further, the linear length of the heat blocking pulse is set in the optimal range. This arrangement enables to record user data precisely in the WORM type information recording medium in which recording marks are formed by partially transforming the recording layer to a crystalline state.

(3) A recording apparatus is the recording apparatus (1) or (2), wherein the length of the heat blocking pulse is increased as a length of a space between adjoining marks which follows immediately after the heat blocking pulse is decreased.

In the recording apparatus (3), the length of the heat blocking pulse is increased as the length of the space which follows immediately after the heat blocking pulse is decreased. This arrangement enables to more uniformly transfer heat generated during the mark formation to the succeeding mark in various signal patterns to thereby make it possible to record information of good quality.

(4) A recording apparatus is any of the recording apparatuses (1) through (3), wherein the power level c of the heat blocking pulse is decreased as a length of a space between adjoining marks which follows immediately after the heat blocking pulse is decreased.

In the recording apparatus (4), the power level of the heat blocking pulse is decreased as the length of the space which follows immediately after the heat blocking pulse is decreased. This arrangement enables to more uniformly transfer heat generated during the mark formation to the succeeding mark in various signal patterns to thereby make it possible to record information of good quality.

(5) A recording apparatus is any of the recording apparatuses (1) through (4), wherein the length of the heat blocking pulse is increased as a length of a mark immediately before the heat blocking pulse is increased.

In the recording apparatus (5), the length of the heat blocking pulse is increased as the length of the mark immediately before the heat blocking pulse is increased. This arrangement enables to more uniformly transfer heat generated during the mark formation to the succeeding mark in various signal patterns to thereby make it possible to record information of good quality.

(6) A recording apparatus is any of the recording apparatuses (1) through (5), wherein the power level c of the heat blocking pulse is decreased as a length of a mark immediately before the heat blocking pulse is increased.

In the recording apparatus (6), the power level of the heat blocking pulse is decreased as the length of the mark immediately before the heat blocking pulse is increased. This arrangement enables to more uniformly transfer heat generated during the mark formation to the succeeding mark in various signal patterns to thereby make it possible to record information of good quality.

(7) An apparatus for recording information in a write-once-read-many type information recording medium by partially transforming a recording layer into a crystalline state by irradiation of a beam to form marks, modulates the beam to form a pulse train, the pulse train comprising: a multi pulse section including, in a portion where the mark is formed, a single pulse or a plurality of pulses each having a first power level a, and a pulse having a second power level b (b<a) between the adjoining pulses of the first power level a if the multi pulse section includes the plurality of pulses of the first power level a; a first heat blocking pulse having a third power level c (c<a) immediately after the multi pulse section; a bias section having a fourth power level d between the first heat blocking pulse and a succeeding multi pulse section, and a second heat blocking pulse having a fifth power level e between the bias section and the succeeding multi pulse section, and the pulse train being so formed that the third power level c, the fourth power level d, and the fifth power level e satisfy a relation: c<d, and e<d.

In the recording apparatus (7), the beam is modulated so that the heat blocking pulse having a lower power level than that of the bias section formed between the multi pulse section and the next multi pulse section is formed before and after the bias section. This arrangement enables to finely control the temperature rise in the frontal part and the rear part of the multi pulse section to thereby make it possible to record information of good quality.

(8) A recording apparatus is the recording apparatus (7), wherein a time length tc of the first heat blocking pulse and a time length td of the second heat blocking pulse which are respectively located immediately before and immediately after the bias section, and a reference clock cycle Tw of a signal to be recorded satisfy a relation: tc+td≧Tw.

In the recording apparatus (8), since the time length of the heat blocking pulse is set in the optimal range, user data can be precisely recorded in the WORM type information recording medium in which recording marks are formed by partially transforming the recording layer to a crystalline state.

(9) A recording apparatus is the recording apparatus (7), wherein a linear length Lc of the first heat blocking pulse and a linear length Ld of the second heat blocking pulse which are respectively located immediately before and immediately after the bias section satisfy a relation: Lc+Ld≧75 nm.

In the recording apparatus (9), since the linear length of the heat blocking pulse is set in the optimal range, user data can be precisely recorded in the WORM type information recording medium in which recording marks are formed by partially transforming the recording layer to a crystalline state.

(10) A recording apparatus is any of the recording apparatuses (7) through (9), wherein a sum of a length of the first heat blocking pulse and a length of the second heat blocking pulse which are respectively located immediately before and immediately after a space between adjoining marks is increased as a length of the space is decreased.

In the recording apparatus (10), the sum of the lengths of the first heat blocking pulse and the second heat blocking pulse which are respectively located immediately before and immediately after the space formed between adjoining marks is increased as the length of the space is decreased. This arrangement enables to more uniformly transfer heat generated during the mark formation to the succeeding mark in various signal patterns to thereby make it possible to record information of good quality.

(11) A recording apparatus is any of the recording apparatuses (7) through (10), wherein the power level c of the first heat blocking pulse is decreased as a length of a space between adjoining marks which follows immediately after the first heat blocking pulse is decreased.

In the recording apparatus (11), the power level of the first heat blocking pulse is decreased as the length of the space which follows immediately after the first heat blocking pulse is decreased. This arrangement enables to more uniformly transfer heat generated during the mark formation to the succeeding mark in various signal patterns to thereby make it possible to record information of good quality.

(12) A recording apparatus is any of the recording apparatuses (7) through (11), wherein the power level e of the second heat blocking pulse is decreased as a length of a space between adjoining marks which is located immediately before the second heat blocking pulse is decreased.

In the recording apparatus (12), the power level of the second heat blocking pulse is decreased as the length of the space located immediately before the second heat blocking pulse is decreased. This arrangement enables to more uniformly transfer heat generated during the mark formation to the succeeding mark in various signal patterns to thereby make it possible to record information of good quality.

(13) A recording apparatus is any of the recording apparatuses (7) through (12), wherein a sum of a length of the first heat blocking pulse and a length of the second heat blocking pulse which are respectively located immediately before and immediately after a space between adjoining marks is increased as a length of a mark followed by the space is increased.

In the recording apparatus (13), the sum of the lengths of the first heat blocking pulse and the second heat blocking pulse which are respectively located immediately before and immediately after the space is increased as the length of the mark followed by the space is increased. This arrangement enables to more uniformly transfer heat generated during the mark formation to the succeeding mark in various signal patterns to thereby make it possible to record information of good quality.

(14) A recording apparatus is any of the recording apparatuses (7) through (13), wherein the power level c of the first heat blocking pulse is decreased as a length of a mark immediately before the first heat blocking pulse is increased.

In the recording apparatus (14), the power level of the first heat blocking pulse is decreased as the length of the mark immediately before the first heat blocking pulse is increased. This arrangement enables to more uniformly transfer heat generated during the mark formation to the succeeding mark in various signal patterns to thereby make it possible to record information of good quality.

(15) A recording apparatus is any of the recording apparatuses (7) through (14), wherein the power level e of the second heat blocking pulse which is located immediately after a space between adjoining marks is decreased as a length of a mark followed by the space is increased.

In the recording apparatus (15), the power level of the second heat blocking pulse located immediately after the space is decreased as the length of the mark followed by the space is increased. This arrangement enables to more uniformly transfer heat generated during the mark formation to the succeeding mark in various signal patterns to thereby make it possible to record information of good quality.

(16) A recording medium is a write-once-read-many type information recording medium for recording information by formation of marks obtained by partially transforming a recording layer into a crystalline state by irradiation of a beam, wherein the mark is formed by irradiating the beam of a modulated waveform as represented by a pulse train, the pulse train comprising: a multi pulse section including, in a portion where the mark is formed, a single pulse or a plurality of pulses each having a first power level a, and a pulse having a second power level b (b<a) between the adjoining pulses of the first power level a if the multi pulse section includes the plurality of pulses of the first power level a; a heat blocking pulse having a third power level c (c<a) immediately after the multi pulse section; and a bias section having a fourth power level d between the heat blocking pulse and a succeeding multi pulse section, the pulse train being so formed that a time length tc of the heat blocking pulse and a reference clock cycle Tw of a signal to be recorded satisfy a relation: $tc \geq Tw$, and the third power level c and the fourth power level d satisfy a relation: c<d, and the first through fourth power levels a, b, c, and d, and the time length tc of the heat blocking pulse being pre-recorded in the information recording medium.

In the recording medium (16), the marks are recorded by irradiation of the beam which is so modulated that the heat blocking pulse having a lower power level than that of the bias section between the multi pulse section and the next multi pulse section is formed between the multi pulse section and the bias section following the multi pulse section, and that the time length of the heat blocking pulse is set in the optimal range. Further, the pulse condition is pre-recorded for this purpose. This arrangement makes it possible to record or reproduce user data precisely.

In the arrangement of the recording medium (16), the phrase "the mark is formed" embraces "the mark is to be formed" as well as "the mark has been formed." The same interpretation is applied to the arrangements of the recording media (17) and (18).

(17) A recording medium is a write-once-read-many type information recording medium for recording information by formation of marks obtained by partially transforming a recording layer into a crystalline state by irradiation of a beam, wherein the mark is formed by irradiating the beam of a modulated waveform as represented by a pulse train, the pulse train comprising: a multi pulse section including, in a portion where the mark is formed, a single pulse or a plurality of pulses each having a first power level a, and a pulse having a second power level b (b<a) between the adjoining pulses of the first power level a if the multi pulse section includes the plurality of pulses of the first power level a; a heat blocking pulse having a third power level c (c<a) immediately after the multi pulse section; and a bias section having a fourth power level d between the heat blocking pulse and a succeeding multi pulse section, the pulse train being so formed that a linear length Lc of the heat blocking pulse satisfies a relation: $Lc \geq 75$ nm, and the third power level c and the fourth power level d satisfy a relation: c<d, and the first through fourth power levels a, b, c, and d, and a time length tc corresponding to the linear length Lc of the heat blocking pulse being pre-recorded in the information recording medium.

In the recording medium (17), the marks are recorded by irradiation of the beam which is so modulated that the heat blocking pulse having a lower power level than that of the bias section between the multi pulse section and the next multi pulse section is formed between the multi pulse section and the bias section following the multi pulse section, and that the linear length of the heat blocking pulse is set in the optimal range. Further, the pulse condition is pre-recorded for this purpose. This arrangement makes it possible to record or reproduce user data precisely.

(18) A recording medium is a write-once-read-many type information recording medium for recording information by formation of marks obtained by partially transforming a recording layer into a crystalline state by irradiation of a beam, wherein the mark is formed by irradiating the beam of a modulated waveform as represented by a pulse train, the pulse train comprising: a multi pulse section including, in a portion where the mark is formed, a single pulse or a plurality of pulses each having a first power level a, and a pulse having a second power level b (b<a) between the adjoining pulses of the first power level a if the multi pulse section includes the plurality of pulses of the first power level a; a first heat blocking pulse having a third power level c (c<a) immediately after the multi pulse section; a bias section having a fourth power level d between the first heat blocking pulse and a succeeding multi pulse section; and a second heat blocking pulse having a fifth power level e between the bias section and the succeeding multi pulse section, the pulse train being so formed that the third power level c, the fourth power level d, and the fifth power level e satisfy a relation: c<d, and e<d, and the first through fifth power levels a, b, c, d, and e, a time length tc of the first heat blocking pulse, and a time length td of the second heat blocking pulse being pre-recorded in the information recording medium.

In the recording medium (18), the marks are recorded by irradiation of the beam which is so modulated that the heat blocking pulse having a lower power level than that of the bias section between the multi pulse section and the next multi pulse section is formed before and after the bias section. Further, the pulse condition is pre-recorded for this purpose. This arrangement makes it possible to record or reproduce user data precisely.

(19) A method for recording information in a write-once-read-many type information recording medium by partially transforming a recording layer into a crystalline state by irradiation of a beam to form marks, modulates the beam to form a pulse train, the pulse train comprising: a multi pulse section including, in a portion where the mark is formed, a single pulse or a plurality of pulses each having a first power level a, and a pulse having a second power level b (b<a) between the adjoining pulses of the first power level a if the multi pulse section includes the plurality of pulses of the first power level a; a heat blocking pulse having a third power level c (c<a) immediately after the multi pulse section; and a bias section having a fourth power level d between the heat blocking pulse and a succeeding multi pulse section, and the pulse train being so formed that a time length tc of the heat blocking pulse and a reference clock cycle Tw of a signal to be recorded satisfy a relation: $tc \geq Tw$, and the third power level c and the fourth power level d satisfy a relation: c<d.

In the recording method (19), the beam is modulated so that the heat blocking pulse having a lower power level than that of the bias section formed between the multi pulse section and the next multi pulse section is formed between the multi pulse section and the bias section following the multi pulse section. Further, the time length of the heat blocking pulse is set in the optimal range. This arrangement enables to record user data precisely in the WORM type information recording medium in which recording marks are formed by partially transforming the recording layer to a crystalline state.

(20) A method for recording information in a write-once-read-many type information recording medium by partially transforming a recording layer into a crystalline state by irradiation of a beam to form marks, modulates the beam to form a pulse train, the pulse train comprising: a multi pulse section including, in a portion where the mark is formed, a single pulse or a plurality of pulses each having a first power level a, and a pulse having a second power level b (b<a) between the adjoining pulses of the first power level a if the multi pulse section includes the plurality of pulses of the first power level a; a heat blocking pulse having a third power level c (c<a) immediately after the multi pulse section; and a bias section having a fourth power level d between the heat blocking pulse and a succeeding multi pulse section, and the pulse train being so formed that a linear length Lc of the heat blocking pulse satisfies a relation: Lc≧75 nm, and the third power level c and the fourth power level d satisfy a relation: c<d.

In the recording method (20), the beam is modulated so that the heat blocking pulse having a lower power level than that of the bias section formed between the multi pulse section and the next multi pulse section is formed between the multi pulse section and the bias section following the multi pulse section. Further, the linear length of the heat blocking pulse is set in the optimal range. This arrangement enables to record user data precisely in the WORM type information recording medium in which recording marks are formed by partially transforming the recording layer to a crystalline state.

(21) A method for recording information in a write-once-read-many type information recording medium by partially transforming a recording layer into a crystalline state by irradiation of a beam to form marks, modulates the beam to form a pulse train, the pulse train comprising: a multi pulse section including, in a portion where the mark is formed, a single pulse or a plurality of pulses each having a first power level a, and a pulse having a second power level b (b<a) between the adjoining pulses of the first power level a if the multi pulse section includes the plurality of pulses of the first power level a; a first heat blocking pulse having a third power level c (c<a) immediately after the multi pulse section; a bias section having a fourth power level d between the first heat blocking pulse and a succeeding multi pulse section; and a second heat blocking pulse having a fifth power level e between the bias section and the succeeding multi pulse section, and the pulse train being so formed that the third power level c, the fourth power level d, and the fifth power level e satisfy a relation: c<d, and e<d.

In the recording method (21), the beam is modulated so that the heat blocking pulse having a lower power level than that of the bias section formed between the multi pulse section and the next multi pulse section is formed before and after the bias section. This arrangement enables to finely control the temperature rise in the frontal part and the rear part of the multi pulse section to thereby make it possible to record information of good quality.

(22) A program is a program for recording information in an information recording medium. The program causes a computer-operated apparatus for recording information in a write-once-read-many type information recording medium by partially transforming a recording layer into a crystalline state by irradiation of a beam to form marks, to function as: multi pulse section forming means for modulating the beam so as to form a multi pulse section including, in a portion where the mark is formed, a single pulse or a plurality of pulses each having a first power level a, and a pulse having a second power level b (b<a) between the adjoining pulses of the first power level a if the multi pulse section includes the plurality of pulses of the first power level a; heat blocking pulse forming means for modulating the beam so as to form a heat blocking pulse having a third power level c (c<a) immediately after the multi pulse section; and bias section forming means for modulating the beam so as to form a bias section having a fourth power level d between the heat blocking pulse and a succeeding multi pulse section, wherein the heat blocking pulse forming means and the bias section forming means modulate the beam in such a manner that a time length tc of the heat blocking pulse and a reference clock cycle Tw of a signal to be recorded satisfy a relation: tc≧Tw, and the third power level c and the fourth power level d satisfy a relation: c<d.

In the program (22), the beam is modulated so that the heat blocking pulse having a lower power level than that of the bias section formed between the multi pulse section and the next multi pulse section is formed between the multi pulse section and the bias section following the multi pulse section. Further, the time length of the heat blocking pulse is set in the optimal range. This arrangement enables to record user data precisely in the WORM type information recording medium in which recording marks are formed by partially transforming the recording layer to a crystalline state.

(23) A program is a program for recording information in information recording medium. The program causes a computer-operated apparatus for recording information in a write-once-read-many type information recording medium by partially transforming a recording layer into a crystalline state by irradiation of a beam to form marks, to function as: multi pulse section forming means for modulating the beam so as to form a multi pulse section including, in a portion where the mark is formed, a single pulse or a plurality of pulses each having a first power level a, and a pulse having a second power level b (b<a) between the adjoining pulses of the first power level a if the multi pulse section includes the plurality of pulses of the first power level a; heat blocking pulse forming means for modulating the beam so as to form a heat blocking pulse having a third power level c (c<a) immediately after the multi pulse section; and bias section forming means for modulating the beam so as to form a bias section having a fourth power level d between the heat blocking pulse and a succeeding multi pulse section, wherein the heat blocking pulse forming means and the bias section forming means modulate the beam in such a manner that a linear length Lc of the heat blocking pulse satisfies a relation: Lc≧75 nm, and the third power level c and the fourth power level d satisfy a relation: c<d.

In the program (23), the beam is modulated so that the heat blocking pulse having a lower power level than that of the bias section formed between the multi pulse section and the next multi pulse section is formed between the multi pulse section and the bias section following the multi pulse section. Further, the linear length of the heat blocking pulse is set in the optimal range. This arrangement enables to record user data precisely in the WORM type information recording medium in which recording marks are formed by partially transforming the recording layer to a crystalline state.

(24) A program is a program for recording information in an information recording medium. The program causes a computer-operated apparatus for recording information in a write-once-read-many type information recording medium by partially transforming a recording layer into a crystalline state by irradiation of a beam to form marks, to function as: multi pulse section forming means for modulating the beam so as to form a multi pulse section including, in a portion where the mark is formed, a single pulse or a plurality of pulses each having a first power level a, and a pulse having a second power level b (b<a) between the adjoining pulses of the first power level a if the multi pulse section includes the plurality of pulses of the first power level a; first heat blocking pulse forming means for modulating the beam so as to form a first heat blocking pulse having a third power level c (c<a) immediately after the multi pulse section; bias section forming means for modulating the beam so as to form a bias section having a fourth power level d between the heat blocking pulse and a succeeding multi pulse section; and second heat blocking pulse forming means for modulating the beam so as to form a second heat pulse having a fifth power level e between the bias section and the succeeding multi pulse section, wherein the first heat blocking pulse forming means, the bias section forming means, and the second heat blocking pulse forming means modulate the beam in such a manner that the third power level c, the fourth power level d, and the fifth power level e satisfy a relation: c<d, and e<d.

In the program (24), the beam is modulated so that the heat blocking pulse having a lower power level than that of the bias section formed between the multi pulse section and the next multi pulse section is formed before and after the bias section. This arrangement enables to finely control the temperature rise in the frontal part and the rear part of the multi pulse section to thereby make it possible to record information of good quality.

(25) A program product comprises: any of the programs (22) through (24), and a signal holding medium for holding the program.

In the program product (25), since the program of any one of the programs (22) through (24) is held in the signal holding medium, user data can be precisely recorded in the information recording medium by causing the computer to read the program held in the signal holding medium.

(26) A program product is the program product (25), wherein the signal holding medium is at least one of a storage medium and a transmission medium.

In the program product (26), since the program is held in at least one of a storage medium and a transmission medium, user data can be precisely recorded in the information recording medium by causing the computer to read the program held in at least one of those media.

The present application is based on Japanese Patent Application No. 2003-146774 filed on May 23, 2003, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An apparatus for recording information in a write-once-read-many type information recording medium by partially changing a phase of a recording layer by irradiation of a beam to form marks, wherein the apparatus modulates the beam to form a pulse train, the pulse train comprising:
   a multi pulse section including, in a portion where the mark is formed, a single pulse or a plurality of pulses each having a first power level a, and a pulse having a second power level b (b<a) between the adjoining pulses of the first power level a if the multi pulse section includes the plurality of pulses of the first power level a;
   a heat blocking pulse having a third power level c (c<a) immediately after the multi pulse section; and
   a bias section having a fourth power level d between the heat blocking pulse and a succeeding multi pulse section, and
   the pulse train being so formed that a time length tc of the heat blocking pulse and a reference clock cycle Tw of a signal to be recorded satisfy a relation: tc≧Tw, and the third power level c and the fourth power level d satisfy a relation: c<d.

2. An apparatus for recording information in a write-once-read-many type information recording medium by partially changing a phase of a recording layer by irradiation of a beam to form marks, wherein the apparatus modulates the beam to form a pulse train, the pulse train comprising:
   a multi pulse section including, in a portion where the mark is formed, a single pulse or a plurality of pulses each having a first power level a, and a pulse having a second power level b (b<a) between the adjoining pulses of the first power level a if the multi pulse section includes the plurality of pulses of the first power level a;
   a heat blocking pulse having a third power level c (c<a) immediately after the multi pulse section; and
   a bias section having a fourth power level d between the heat blocking pulse and a succeeding multi pulse section, and
   the pulse train being so formed that a linear length Lc of the heat blocking pulse satisfies a relation: Lc≧75 nm, and the third power level c and the fourth power level d satisfy a relation: c<d.

3. The recording apparatus according to claim 1, wherein the length of the heat blocking pulse is increased as a length of a space between adjoining marks which follows immediately after the heat blocking pulse is decreased.

4. The recording apparatus according to claim 2, wherein the length of the heat blocking pulse is increased as a length of a space between adjoining marks which follows immediately after the heat blocking pulse is decreased.

5. The recording apparatus according to claim 1, wherein the power level c of the heat blocking pulse is decreased as a length of a space between adjoining marks which follows immediately after the heat blocking pulse is decreased.

6. The recording apparatus according to claim 2, wherein the power level c of the heat blocking pulse is decreased as a length of a space between adjoining marks which follows immediately after the heat blocking pulse is decreased.

7. The recording apparatus according to claim 1, wherein the length of the heat blocking pulse is increased as a length of a mark immediately before the heat blocking pulse is increased.

8. The recording apparatus according to claim 2, wherein the length of the heat blocking pulse is increased as a length of a mark immediately before the heat blocking pulse is increased.

9. The recording apparatus according to claim 1, wherein the power level c of the heat blocking pulse is decreased as a length of a mark immediately before the heat blocking pulse is increased.

10. The recording apparatus according to claim 2, wherein the power level c of the heat blocking pulse is decreased as a length of a mark immediately before the heat blocking pulse is increased.

11. An apparatus for recording information in a write-once-read-many type information recording medium by partially changing a phase of a recording layer by irradiation of a beam to form marks, wherein the apparatus modulates the beam to form a pulse train, the pulse train comprising:
   a multi pulse section including, in a portion where the mark is formed, a single pulse or a plurality of pulses each having a first power level a, and a pulse having a second power level b (b<a) between the adjoining pulses of the first power level a if the multi pulse section includes the plurality of pulses of the first power level a;

a first heat blocking pulse having a third power level c (c<a) immediately after the multi pulse section;

a bias section having a fourth power level d between the first heat blocking pulse and a succeeding multi pulse section, and a second heat blocking pulse having a fifth power level e between the bias section and the succeeding multi pulse section, and the pulse train being so formed that the third power level c, the fourth power level d, and the fifth power level e satisfy a relation: c<d, and e<d.

12. The recording apparatus according to claim 11, wherein a time length tc of the first heat blocking pulse and a time length td of the second heat blocking pulse which are respectively located immediately before and immediately after the bias section, and a reference clock cycle Tw of a signal to be recorded satisfy a relation: tc+td≧Tw.

13. The recording apparatus according to claim 11, wherein a linear length Lc of the first heat blocking pulse and a linear length Ld of the second heat blocking pulse which are respectively located immediately before and immediately after the bias section satisfy a relation: Lc+Ld≧75 nm.

14. The recording apparatus according to claim 11, wherein a sum of a length of the first heat blocking pulse and a length of the second heat blocking pulse which are respectively located immediately before and immediately after a space between adjoining marks is increased as a length of the space is decreased.

15. The recording apparatus according to claim 11, wherein the power level c of the first heat blocking pulse is decreased as a length of a space between adjoining marks which follows immediately after the first heat blocking pulse is decreased.

16. The recording apparatus according to claim 11, wherein the power level e of the second heat blocking pulse is decreased as a length of a space between adjoining marks which is located immediately before the second heat blocking pulse is decreased.

17. The recording apparatus according to claim 11, wherein a sum of a length of the first heat blocking pulse and a length of the second heat blocking pulse which are respectively located immediately before and immediately after a space between adjoining marks is increased as a length of a mark followed by the space is increased.

18. The recording apparatus according to claim 11, wherein the power level c of the first heat blocking pulse is decreased as a length of a mark immediately before the first heat blocking pulse is increased.

19. The recording apparatus according to claim 11, wherein the power level e of the second heat blocking pulse which is located immediately after a space between adjoining marks is decreased as a length of a mark followed by the space is increased.

20. A write-once-read-many type information recording medium for recording information by formation of marks obtained by partially changing a phase of a recording layer by irradiation of a beam, wherein the mark is formed by irradiating the beam of a modulated waveform as represented by a pulse train, the pulse train comprising:

a multi pulse section including, in a portion where the mark is formed, a single pulse or a plurality of pulses each having a first power level a, and a pulse having a second power level b (b<a) between the adjoining pulses of the first power level a if the multi pulse section includes the plurality of pulses of the first power level a;

a heat blocking pulse having a third power level c (c<a) immediately after the multi pulse section; and a bias section having a fourth power level d between the heat blocking pulse and a succeeding multi pulse section, the pulse train being so formed that a time length tc of the heat blocking pulse and a reference clock cycle Tw of a signal to be recorded satisfy a relation: tc≧Tw, and the third power level c and the fourth power level d satisfy a relation: c<d, and the first through fourth power levels a, b, c, and d, and the time length tc of the heat blocking pulse being pre-recorded in the information recording medium.

21. A write-once-read-many type information recording medium for recording information by formation of marks obtained by partially changing a phase of a recording layer by irradiation of a beam, wherein the mark is formed by irradiating the beam of a modulated waveform as represented by a pulse train, the pulse train comprising:

a multi pulse section including, in a portion where the mark is formed, a single pulse or a plurality of pulses each having a first power level a, and a pulse having a second power level b (b<a) between the adjoining pulses of the first power level a if the multi pulse section includes the plurality of pulses of the first power level a;

a heat blocking pulse having a third power level c (c<a) immediately after the multi pulse section; and a bias section having a fourth power level d between the heat blocking pulse and a succeeding multi pulse section, the pulse train being so formed that a linear length Lc of the heat blocking pulse satisfies a relation: Lc≧75 nm, and the third power level c and the fourth power level d satisfy a relation: c<d, and the first through fourth power levels a, b, c, and d, and a time length tc corresponding to the linear length Lc of the heat blocking pulse being pre-recorded in the information recording medium.

22. A write-once-read-many type information recording medium for recording information by formation of marks obtained by partially changing a phase of a recording layer by irradiation of a beam, wherein the mark is formed by irradiating the beam of a modulated waveform as represented by a pulse train, the pulse train comprising:

a multi pulse section including, in a portion where the mark is formed, a single pulse or a plurality of pulses each having a first power level a, and a pulse having a second power level b (b<a) between the adjoining pulses of the first power level a if the multi pulse section includes the plurality of pulses of the first power level a;

a first heat blocking pulse having a third power level c (c<a) immediately after the multi pulse section;

a bias section having a fourth power level d between the first heat blocking pulse and a succeeding multi pulse section; and a second heat blocking pulse having a fifth power level e between the bias section and the succeeding multi pulse section, the pulse train being so formed that the third power level c, the fourth power level d, and the fifth power level e satisfy a relation: c<d, and e<d, and the first through fifth power levels a, b, c, d, and e, a time length tc of the first heat blocking pulse, and a time length td of the second heat blocking pulse being pre-recorded in the information recording medium.

23. A method for recording information in a write-once-read-many type information recording medium by partially changing a phase of a recording layer by irradiation of a beam to form marks, wherein the method modulates the beam to form a pulse train, the pulse train comprising:
   a multi pulse section including, in a portion where the mark is formed, a single pulse or a plurality of pulses each having a first power level a, and a pulse having a second power level b (b<a) between the adjoining pulses of the first power level a if the multi pulse section includes the plurality of pulses of the first power level a;
   a heat blocking pulse having a third power level c (c<a) immediately after the multi pulse section; and
   a bias section having a fourth power level d between the heat blocking pulse and a succeeding multi pulse section, and
   the pulse train being so formed that a time length tc of the heat blocking pulse and a reference clock cycle Tw of a signal to be recorded satisfy a relation: tc≧Tw, and the third power level c and the fourth power level d satisfy a relation: c<d.

24. A method for recording information in a write-once-read-many type information recording medium by partially changing a phase of a recording layer by irradiation of a beam to form marks, wherein the method modulates the beam to form a pulse train, the pulse train comprising:
   a multi pulse section including, in a portion where the mark is formed, a single pulse or a plurality of pulses each having a first power level a, and a pulse having a second power level b (b<a) between the adjoining pulses of the first power level a if the multi pulse section includes the plurality of pulses of the first power level a;
   a heat blocking pulse having a third power level c (c<a) immediately after the multi pulse section; and
   a bias section having a fourth power level d between the heat blocking pulse and a succeeding multi pulse section, and
   the pulse train being so formed that a linear length Lc of the heat blocking pulse satisfies a relation: Lc≧75 nm, and the third power level c and the fourth power level d satisfy a relation: c<d.

25. A method for recording information in a write-once-read-many type information recording medium by partially changing a phase of a recording layer by irradiation of a beam to form marks, wherein the method modulates the beam to form a pulse train, the pulse train comprising:
   a multi pulse section including, in a portion where the mark is formed, a single pulse or a plurality of pulses each having a first power level a, and a pulse having a second power level b (b<a) between the adjoining pulses of the first power level a if the multi pulse section includes the plurality of pulses of the first power level a;
   a first heat blocking pulse having a third power level c (c<a) immediately after the multi pulse section;
   a bias section having a fourth power level d between the first heat blocking pulse and a succeeding multi pulse section; and
   a second heat blocking pulse having a fifth power level e between the bias section and the succeeding multi pulse section, and
   the pulse train being so formed that the third power level c, the fourth power level d, and the fifth power level e satisfy a relation: c<d, and e<d.

26. A program for recording information in an information recording medium, the program causing a computer-operated apparatus for recording information in a write-once-read-many type information recording medium by partially changing a phase of a recording layer by irradiation of a beam to form marks, to function as:
   multi pulse section forming means for modulating the beam so as to form a multi pulse section including, in a portion where the mark is formed, a single pulse or a plurality of pulses each having a first power level a, and a pulse having a second power level b (b<a) between the adjoining pulses of the first power level a if the multi pulse section includes the plurality of pulses of the first power level a;
   heat blocking pulse forming means for modulating the beam so as to form a heat blocking pulse having a third power level c (c<a) immediately after the multi pulse section; and
   bias section forming means for modulating the beam so as to form a bias section having a fourth power level d between the heat blocking pulse and a succeeding multi pulse section, wherein
   the heat blocking pulse forming means and the bias section forming means modulate the beam in such a manner that a time length tc of the heat blocking pulse and a reference clock cycle Tw of a signal to be recorded satisfy a relation: tc≧Tw, and the third power level c and the fourth power level d satisfy a relation: c<d.

27. A program product, comprising:
   the program according to claim 26; and
   a signal holding medium for holding the program.

28. A program product according to claim 27, wherein the signal holding medium is at least one of a storage medium and a transmission medium.

29. A program for recording information in an information recording medium, the program causing a computer-operated apparatus for recording information in a write-once-read-many type information recording medium by partially changing a phase of a recording layer by irradiation of a beam to form marks, to function as:
   multi pulse section forming means for modulating the beam so as to form a multi pulse section including, in a portion where the mark is formed, a single pulse or a plurality of pulses each having a first power level a, and a pulse having a second power level b (b<a) between the adjoining pulses of the first power level a if the multi pulse section includes the plurality of pulses of the first power level a;
   heat blocking pulse forming means for modulating the beam so as to form a heat blocking pulse having a third power level c (c<a) immediately after the multi pulse section; and
   bias section forming means for modulating the beam so as to form a bias section having a fourth power level d between the heat blocking pulse and a succeeding multi pulse section, wherein
   the heat blocking pulse forming means and the bias section forming means modulate the beam in such a manner that a linear length Lc of the heat blocking pulse satisfies a relation: Lc≧75 nm, and the third power level c and the fourth power level d satisfy a relation: c<d.

30. A program for recording information in an information recording medium, the program causing a computer-operated apparatus for recording information in a write-once-read-many type information recording medium by partially changing a phase of a recording layer by irradiation of a beam to form marks, to function as:

multi pulse section forming means for modulating the beam so as to form a multi pulse section including, in a portion where the mark is formed, a single pulse or a plurality of pulses each having a first power level a, and a pulse having a second power level b (b<a) between the adjoining pulses of the first power level a if the multi pulse section includes the plurality of pulses of the first power level a;

first heat blocking pulse forming means for modulating the beam so as to form a first heat blocking pulse having a third power level c (c<a) immediately after the multi pulse section;

bias section forming means for modulating the beam so as to form a bias section having a fourth power level d between the heat blocking pulse and a succeeding multi pulse section; and second heat blocking pulse forming means for modulating the beam so as to form a second heat pulse having a fifth power level e between the bias section and the succeeding multi pulse section, wherein the first heat blocking pulse forming means, the bias section forming means, and the second heat blocking pulse forming means modulate the beam in such a manner that the third power level c, the fourth power level d, and the fifth power level e satisfy a relation: c<d, and e<d.

* * * * *